(12) United States Patent
Raber

(10) Patent No.: US 7,480,099 B2
(45) Date of Patent: Jan. 20, 2009

(54) VARIABLE FOCUS SYSTEM

(75) Inventor: Peter E. Raber, North Bellmore, NY (US)

(73) Assignee: PC Mirage LLC, Baltimore, MD (US)

( * ) Notice: Subject to any disclaimer, the term of this patent is extended or adjusted under 35 U.S.C. 154(b) by 0 days.

(21) Appl. No.: 11/398,175

(22) Filed: Apr. 5, 2006

(65) Prior Publication Data

US 2006/0181780 A1    Aug. 17, 2006

Related U.S. Application Data

(62) Division of application No. 10/728,278, filed on Dec. 4, 2003, now Pat. No. 7,046,447.

(60) Provisional application No. 60/444,854, filed on Feb. 4, 2003, provisional application No. 60/439,776, filed on Jan. 13, 2003.

(51) Int. Cl.
*G02B 27/10* (2006.01)
*G02B 26/08* (2006.01)
*G02B 26/00* (2006.01)

(52) U.S. Cl. .................... 359/626; 359/625; 359/627; 359/619; 359/223; 359/225; 359/226; 359/290; 359/291; 359/292

(58) Field of Classification Search .......... 359/290–292, 359/223–226, 619, 625–627, 630, 631, 633, 359/666

See application file for complete search history.

(56) References Cited

U.S. PATENT DOCUMENTS

| 2,002,376 | A  | * | 5/1935  | Mannheimer  | 40/582  |
| 6,445,509 | B1 | * | 9/2002  | Alden       | 359/666 |
| 6,628,385 | B1 | * | 9/2003  | Osipchuk et al. | 356/318 |
| 6,778,246 | B2 |   | 8/2004  | Sun et al.  |         |
| 6,900,901 | B2 | * | 5/2005  | Harada      | 358/1.1 |
| 6,956,687 | B2 | * | 10/2005 | Moon et al. | 359/223 |

* cited by examiner

*Primary Examiner*—William C Choi
*Assistant Examiner*—Jack Dinh
(74) *Attorney, Agent, or Firm*—Downs Rachlin Martin PLLC

(57) ABSTRACT

A variable focus system that includes an electrovariable optic (EVO) and a controller operatively configured for changing the focal configuration of the EVO. The EVO includes a plurality of movable optical elements that may be moved substantially in unison with one another so as to change either the focal length of the EVO, the direction of the focal axis of the EVO, or both, depending upon the needs of a particular application. The variable focus system may be used in conjunction with an image source to construct a 3D floating image projector that projects a series of 2D image slices of a 3D image onto corresponding respective image planes in succession rapidly enough that a 3D floating image is perceived by a viewer.

11 Claims, 10 Drawing Sheets

VARIABLE FOCUS SYSTEM

RELATED APPLICATIONS

This application is a divisional of U.S. application Ser. No. 10/728,278 filed Dec. 4, 2003, and incorporated by reference herein. This application also claims the benefit of priority of U.S. Provisional Patent Application Ser. No. 60/439,776, filed Jan. 13, 2003, and entitled "Electrovariable Optic and Its Application to 3D and Floating Image Displays," and U.S. Provisional Patent Application Ser. No. 60/444,854, filed Feb. 4, 2003, and entitled "Electrovariable Optic Comprising an Array of Moving Flexible Electrodes and its Application to 3D Floating Image Displays," which are incorporated by reference herein in their entireties.

FIELD OF THE INVENTION

The present invention generally relates to the field of optics. More particularly, the present invention is directed to a variable focus system.

BACKGROUND OF THE INVENTION

Variable-power optics have long been sought after for a wide variety of applications. One outstanding example of such applications is that of 3D image production. Relatively low cost, high quality and convenient 3D video, cinema and image displays have likewise long been sought after to capture viewer interest, enhance the viewing experience, increase the functionality of computer systems and/or create new uses for 3D imaging. To date, however, conventional 3D light imaging systems have fallen short of being low cost, high quality, convenient and/or suitable for video or cinema. Examples of conventional systems include stereographic systems that require specialized eyewear or headgear to provide one eye of a viewer with an image that is slightly different in perspective from the image provided to the other eye. Drawbacks of these systems include the necessity of wearing bulky, uncomfortable and/or inconvenient viewing devices.

Other types of conventional 3D light imaging systems include volumetric displays, such as voxel displays having many self-luminescent volumetric elements that are individually controlled to produce a 3D image and multi-planar displays having a plurality of variable-opacity screens spaced from one another onto which corresponding slices of each image are sequentially projected in rapid succession to create a 3D image. Drawbacks of these types of systems include the need for large, heavy and expensive display elements comprising either voxels or multiple planar screens.

Moreover, voxel and multi-planar displays by themselves do not project 3D images into free-space to make the images appear to "float" in space. Rather, the 3D images of these devices appear within the thicknesses of their display elements. That said, however, a real image projector may be used to project the 3D image of a multi-planar screen device or voxel device into free-space so that the 3D image appears to float in space beyond the projector. This arrangement is shown in connection with a multi-planar screen device in U.S. Pat. No. 6,100,862 to Sullivan and U.S. Pat. No. 6,466,185 to Sullivan et al., which are incorporated herein by reference. However, this type of system is large and heavy due to the multi-planar screen element and even more expensive than the multi-planar device itself due to the addition of the real image projector. What is needed is a relatively inexpensive and lightweight real imaging system.

SUMMARY OF THE INVENTION

In one aspect, the present invention is directed to a variable focus system comprising an optic that includes a plurality of movable optical elements. A controller is coupled to the optic. The controller generates at least a first signal and a second signal. The first signal causes at least some of the plurality of optical elements to move so as to provide the optic with a first focal configuration. The second signal causes at least some of the plurality of optical elements to move so as to provide the optic with a second focal configuration different from the first focal configuration.

In another aspect, the present invention is directed to a system for projecting a plurality of 2D images onto a plurality of corresponding respective image planes. The system comprises at least one image source providing a plurality of 2D images and an electrovariable optic reconfigurable to focus each one of the plurality of 2D images onto a plurality of corresponding respective image planes. A controller is coupled with the at least one image source and the electrovariable optic. The controller controls the at least one image source and the electrovariable optic so as to focus each one of the plurality of 2D images onto the plurality of corresponding respective image planes.

In a further aspect, the present invention is directed to a method of controlling an optic that includes an array of movable optical elements. The method comprises the step of moving at least some of the movable optical elements in the array substantially simultaneously with one another so that the array of movable optical elements has a first focal point. Then, at least some of the movable optical elements in the array are moved substantially simultaneously with one another so that the array of movable optical elements has a second focal point spaced from the first focal point.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION OF THE DRAWINGS

Figure 1:
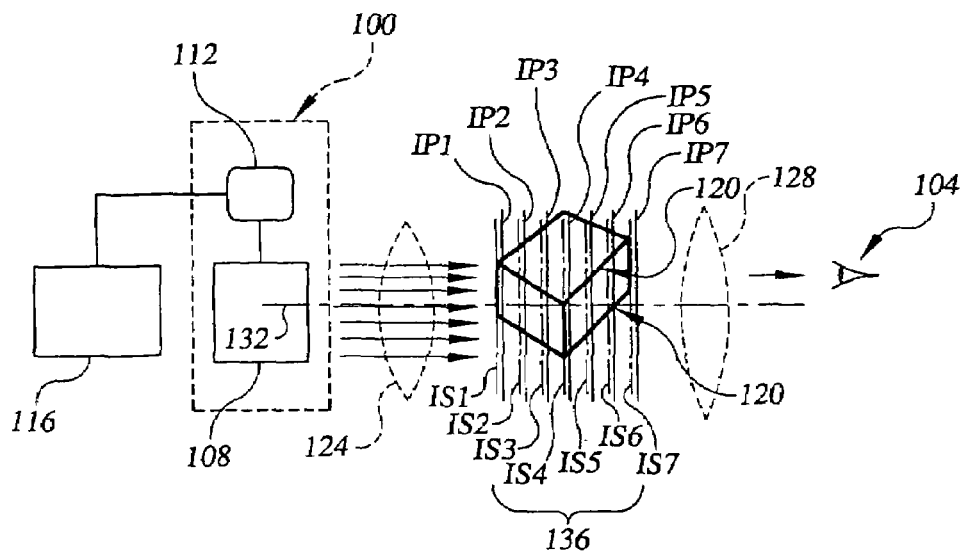
FIG. 1 is a simplified schematic diagram showing a variable focus system of the present invention in conjunction with an image source for creating 3D images.

Referring now to the drawings, FIG. 1 shows in accordance with the present invention a variable focus system, which is generally denoted by the numeral 100. As discussed below in detail, system 100 may be used, either alone or in combination with other optics, for displaying 3D images in free-space so that the images appear to a viewer 104 to be floating in space. As those skilled in the art will readily appreciate, although system 100 is primarily described in connection with displaying real 3D images in free space, the system is not so limited. On the contrary, variable focus system 100 may be used in any of a variety of applications wherein it is desired to selectively change the focus (or convergence or divergence) of electromagnetic energy. The applications for which variable focus system 100 may be used can be highly diverse from one another in terms of both type and technical field. Some of these applications are described below, and others will become apparent to those skilled in the art upon reading this disclosure.

Two primary components of system 100 are an electrovariable optic (EVO) 108 and a controller 112 that controls the EVO in a manner that changes the focus of electromagnetic energy, e.g., visible light, infrared light, ultraviolet light or microwaves, among others, incident the EVO. A common principle underlying the varied and diverse applications of variable focus system 100 mentioned above is the selective adjustment of EVO 108 by controller 112 to change the focus of the incident electromagnetic energy from a source, e.g., image source 116 or any "source" of electromagnetic energy.

In the context of the present invention, the term "source" includes not only devices and bodies that emit electromagnetic energy, but also bodies that reflect, transmit and/or absorb electromagnetic energy from one or more emissive sources, as well as real and/or virtual images of such sources. Moreover, the phrase "changing the focus," and similar phrases, include the actions of changing the focal length of EVO 108 or changing the direction of the focal axis (132) of the EVO or a combination of these two.

For example, changing the focal length of EVO 108 allows the EVO, among other things, to focus electromagnetic energy from a source, e.g., source 116, located in a location fixed relative to the EVO onto a plurality of image points spaced from one another along a linear line in seriatim or, conversely, focus a plurality of sources spaced apart along a linear line, in seriatim, onto a common image point. Changing the direction of the focal axis of EVO 108 allows the EVO, among other things, to focus electromagnetic energy from a source located in a location fixed relative to the EVO onto a plurality of image points spaced from one another along an arcuate line in seriatim or, conversely, focus a plurality of sources spaced apart along an arcuate line, in seriatim, onto a common image point. Of course, changing both the focal length and focal direction of EVO 108 simultaneously allows the EVO, among other things, to focus, in seriatim, electromagnetic energy from a single source fixed relative to the EVO onto a plurality of image points located virtually anywhere in space within the reflective or refractive limits of the EVO or, conversely, focus, in seriatim, electromagnetic energy from a plurality of sources located anywhere in space within the reflective or refractive limits of the EVO to a common image point. With EVO 108 and controller 112 having such flexibility, those skilled in the art will readily appreciate the applicability of these components to applications much different than the real image projection application of system 100 that is described below.

That said, however, when variable focus system 100 is used for projecting real images into free space, the system may be used in conjunction with at least one image source 116, e.g., a 2D video display, that displays a series of 2D images. In this application, image source 116 may be controlled by controller 112 so as to focus the 2D images onto a plurality of image planes, e.g., image planes IP1-IP7, in succession with one another. If the content of each 2D image corresponds to a respective "slice" of a desired 3D image 120, and these images are projected onto image planes IP1-IP7 in sufficiently rapid succession, then a perceptible 3D image will be formed among the image planes. It is noted that references to "image plane," "focal plane" and the like throughout this disclosure are intended to apply to extended two-dimensional image regions, some of which may in fact be curved (e.g., due to optical field curvature) rather than planar. Despite the use of the term "plane" and like terms, and the depiction in the figures of such surfaces as planar, such references are intended to also include such curved surfaces without loss of generality.

In general, and as mentioned above, an EVO of the present invention, such as EVO 108 of FIG. 1, may be controlled in a manner that changes either its focal length or direction of its focal axis, or both. Consequently, since both of these concepts relate to the focusing characteristics of the EVO, the term "focal configuration," and similar terms, are used herein and in the appended claims relative to the EVO to capture the configurability of the EVO encompassed by the present invention. Thus, when it is said that a controller of the present invention, such as controller 112, is operatively configured to change the "focal configuration" of an EVO of the present invention, this means that the controller is operatively configured to change: (1) the focal length of the EVO or (2) the direction of the focal axis of the EVO or (3) both the focal length and focal axis direction of the EVO. Those skilled in the art will appreciate how an EVO of the present invention must be "focally configured" in order to suit a particular application. The following disclosure discusses some of the scenarios when it is appropriate to control one, the other or both of the focal length and focal axis direction.

In one embodiment, variable focus system 100 may be used to project 3D image 120 into free space. In this case, image planes IP1-IP7 will be located in free space. In other embodiments, variable focus system 100 may be adapted for displaying 3D image 120 within a screen structure (not shown), such as the multi-panel variable opacity screen structure disclosed in the Sullivan and Sullivan et al. patents discussed in the background section above and incorporated into this disclosure by reference. In addition, variable focus system 100 may also be used for forming virtual 3D images. Generally, the difference between forming a real image and a virtual image relates to the location of the final optic relative to 3D image 120. When the final optic traversed by the light rays that form 3D image 120 is located behind that image relative to viewer 104, then the image is a real image. This is illustrated by optic 124. On the other hand, if that final optic is located between 3D image 120 and viewer 104, as illustrated by optic 128, then the image is a virtual image.

Variable focus system 100 has many practical applications wherein 3D viewing is desirable and/or necessary, including cinema, video, virtual reality systems, training simulators, video games, lectures and informational presentations, among many others. Those skilled in the art will appreciate that variable focus system 100 of the present invention has broad applicability to a wide variety of uses across many different fields. Therefore, a lengthy list of uses for system 100 is not necessary herein for those skilled in the art to understand the broad scope of the invention. However, some alternative uses of variable focus system 100 are described below. In this connection, it is noted that although the present invention is described mostly in connection with forming images utilizing visible light, the invention is not so limited. On the contrary, the present invention may have applications for focusing electromagnetic energy outside the visible spectrum, e.g., in the radio, infrared or ultraviolet portions of the electromagnetic spectrum, among others. Several examples of uses outside the visible light spectrum are mentioned below in connection with alternative uses of variable focus system 100 of the present invention. Those skilled in the appropriate arts will no doubt recognize other applications for variable focus system 100.

Generally, variable focus system 100 and image source 116 operate as follows to create 3D image 120. For simplicity, system 100 is primarily described in the context of a still image, i.e., an image in which all of the elements therein do not move relative to one another or relative to any fixed reference point outside of the system. Such a still image may be a standalone still image or may constitute a single frame of a moving scene, such as a video and cinematic scene. The primary difference between standalone still images and frames of moving images is the number of times 3D image 120 is displayed during a period of time. For a standalone image, the same 3D image is presented repetitively throughout the entire period of time it is desired to present that image. On the other hand, if 3D image 120 is a frame of a moving image, that frame is generally displayed only a limited number of times, once in some cases, during the length of the moving scene so as to create the illusion of motion with other slightly different frames.

As with any 3D image, 3D image 120 may be considered to be made of a plurality of planar (2D) image slices that are parallel to one another. Depending upon the resolution, these image slices may number from two to infinity. In the present example, seven image slices IS1-IS7, corresponding to the seven image planes IP1-IP7 mentioned above, are shown. Moreover, these image slices may be oriented in any manner relative to 3D image 120. In the present case, however, image slices IS1-IS7 are oriented orthogonally with respect to the depth of 3D image 120, the depth being the dimension of the 3D image along the focal axis 132 of EVO 108. Accordingly, floating 3D image 120 is formed in space by focusing image slices IS1-IS7, provided by image source 116, onto, respectively, image planes I1-IP7 in succession with one another at a rate fast enough to avoid viewer-perceived flicker in the image. This successive focusing of image slices IS1-IS7 onto image planes IP1-IP7 is repeated, generally, for the length of time that 3D image 120 is desired to appear to a viewer.

A benefit of variable focus system 100 is that, generally, image source 116 may be a conventional image source, such as a cathode ray tube, liquid crystal display, plasma display, digital light processor display or projector/screen system, among others. Since those skilled in the art are readily familiar with such devices, image source 116 need not be described in detail herein, although some general performance considerations for the image source are discussed below.

Rapid variation of the focal length of EVO 108 can be carried out at a high enough rate that viewer 104 perceives the motion with respect to the display of image slices IS1-IS7 as continuous rather than discrete. This phenomenon is known as "persistence of vision," and it also provides the basis for cinema and video. Persistence of vision is achieved in cinema and video, and also with the present invention, by rapidly presenting a varying series of still images to a viewer. By making image source 116 a video-type display, the variation of the optical power of EVO 108 may be synchronized, e.g., via controller 112, with 2D video images at a sufficiently high frame rate that multiple image planes IP1-IP7 containing corresponding image slices IS1-IS7 of the video images may be presented to viewer 104, who then perceives the image slices as appearing simultaneously with one another. Since the content of each frame, i.e., image slice IS1-IS7, is completely controllable, the sequential frames can be made to include information suitable for the image depth location provided by EVO 108.

At present, the frame rate of common low-cost consumer-scale video sources is typically less than 200 Hz. In order to provide relatively flicker-free 3D imaging, the total depth of the image region 136 defined by image planes IP1-IP7 should be reproduced at a rate of 24-30 Hz as a goal (i.e., standard movie or television frame rates), or even faster. For a video-type image source of no more than 200 Hz capability, this implies an image depth of 6-8 image planes. Image slices IS1-IS7 reproduced at rates as low as 20 Hz may provide acceptable image quality under certain lighting conditions. In general, the higher the image rate, the better the perceived image quality. As higher image rates typically require a more expensive image source 116, a cost-benefit analysis will need to be performed in selecting image reproduction rates for an intended application.

However, it is expected that future consumer-grade video displays suitable for use as image source 116 will advance to much higher frame rate capabilities, particularly as driven by demand for gaming and other applications, including 3D video imaging. Even today, the cost of digital light processing (DLP) projectors, which can provide frame rates in excess of 1000 Hz at high brightness, is falling rapidly. Furthermore, Grating Light Valve (GLV) technology has similar or greater promise, with even higher contrast ratios. The 6-8 plane image depth limitation associated with conventional 200 Hz analog video sources capability is eliminated with such digital image devices, and the cost of displays utilizing DLP, GLV and other digitally-based technology is expected to fall dramatically. EVO 108 can utilize similar digital technology, and is therefore readily compatible with digital image devices and their high frame rates. Thus, EVO 108 may be used with these video-type image sources to produce 3D floating images with image depths of several dozen image planes. The image depth limitation is generally due to limitations on image source 116 and is not inherent in EVO 108 itself.

Figure 2:
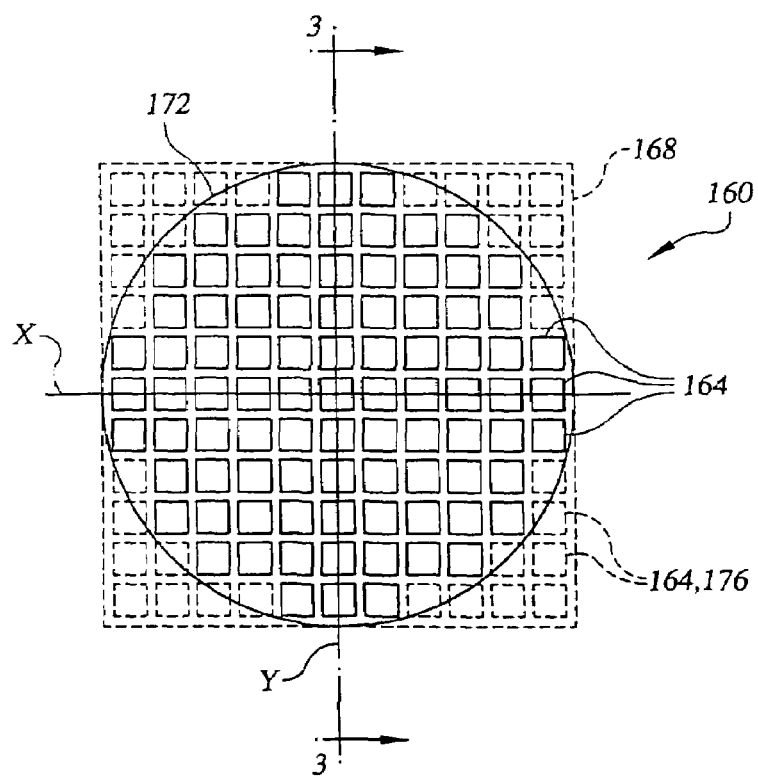
FIG. 2 is a front view of an electrovariable optic (EVO) having a plurality of optical elements suitable for use in the variable focus system of FIG. 1.
Figure 3:
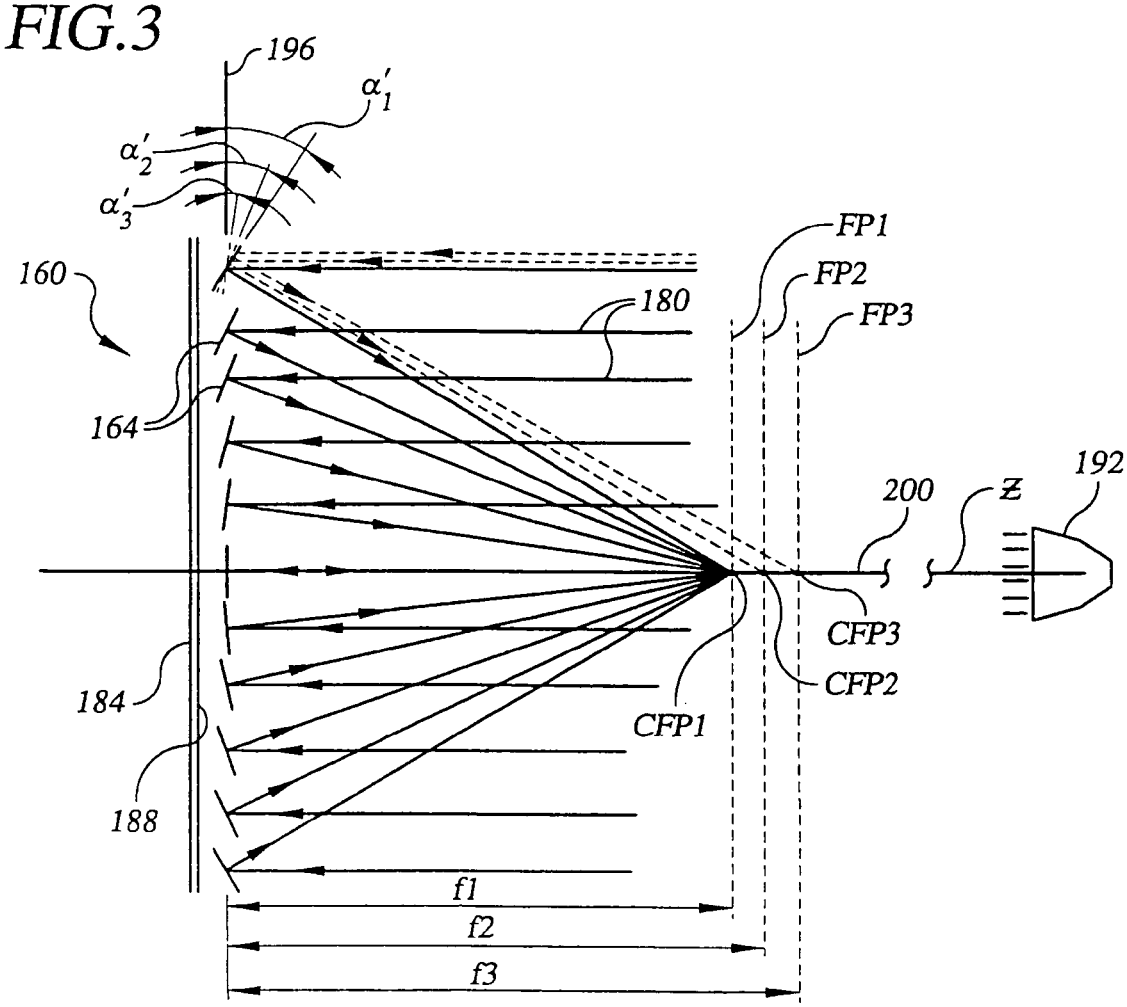
FIG. 3 is an enlarged cross-sectional view of the EVO of FIG. 2 illustrating the variable focus operation of the EVO, and illustrating (for its outer zone only, for the sake of clarity) how it can approximate, as an example, three conventional concave reflectors having different focal lengths.

As mentioned above, EVO 108 is the component of system 100 that focuses image slices IS1-IS7 the EVO receives from image source 116 onto image planes IP1-IP7. FIGS. 2 and 3 illustrate one embodiment of an EVO 160 suitable for use in system 100. EVO 160 may comprise a plurality of optical elements 164, at least some of which are movable to a plurality of orientations corresponding to the plurality of focal lengths of the EVO that allow the EVO to focus image slices, e.g., image slices IS1-IS7 of FIG. 1, onto corresponding image planes, e.g., image planes IP1-IP7 of FIG. 1. Optical elements 164 may be arranged in any suitable manner, such as the rectangular array shown. Optical elements 164 in the rectangular array may be present in a rectangular region 168, circular region 172, or a region of any other shape desired. Circular region 172 may be desired in some applications, e.g., to suit a particular design or to reduce manufacturing costs due to eliminating some of the optical elements 176 located outside the circular region. It is noted that optical elements 164 may be any suitable size, but in the present application their size will typically, but not necessarily, be on the order of conventional micro-electro-mechanical systems (MEMS) elements. In addition, optical elements 164 need not be rectangular, but rather may be another shape, such as circular, or arcuate, among others, selected to suit a particular design.

FIG. 3 illustrates the manner in which EVO 160 achieves its variable focus ability that allows the EVO to focus light or other electromagnetic energy (represented by rays 180) successively onto multiple focal planes, such as focal planes FP1-FP3 shown. (EVO 160 is here depicted as simulating a parabolic optic, focusing collimated light rays from infinite conjugates onto multiple focal planes. However, as those skilled in the art will appreciate, the method shown is applicable to other effective optical shapes and to the focus of finite-conjugate light rays to corresponding multiple image planes as well.) Optical elements 164 may be mounted on a substrate 184 that provides the optical elements with stable and rigid support relative to the internal and external forces EVO 160 will be subject to during normal use. Among others, internal forces are due to, e.g., the weight and movement of optical elements 164, and external forces are due to, e.g., forces involved in transporting a device (not shown) incorporating EVO 160 from one location to another. Substrate 184 may be any sort of structure suitable for a particular application and/or type of optical elements 164. For example, optical elements 164 may be MEMS-type elements fabricated on a silicon wafer. In this case, substrate 184 is the silicon wafer. In other cases, some of which are described below, substrate 184 may include a conventional optic or other relatively rigid body, including float glass. Substrate 184 may desirably be transparent in some applications. Substrate 184 may have a surface 188 to which optical elements are mounted. Surface 188 may be planar, curved, or have any other suitable profile. Alternatively, substrate 184 may be an open-type structure and, therefore, need not have a continuous mounting surface. For example, substrate 184 may have a plurality of discrete mounting points, where optical elements 164 may be mounted, that define the desired profile.

FIG. 3 shows optical elements 164 as planar reflective elements that reflect rays 180 back toward a nearby focus in a direction generally toward source 192. (Here, source 192 is intended to be understood schematically, for example as representing a large source, or source image, at near-infinite distance that produces rays 180 substantially parallel to the EVO axis, as well as other parallel families of rays (not shown) at other angles to that axis. In this illustrative example, EVO 160 is preferably designed to approximate a parabolic mirror; however, the effects described are equally applicable to other configurations without loss of generality.) Variable focus of EVO 160 may be achieved by moving, e.g., tilting, the necessary optical elements 164 by a tilt angle $\alpha'$ relative to a frame of reference, e.g., plane 196, so that rays 180 reflected from each optical element are reflected to the same focal plane, e.g., FP1, FP2, or FP3, at substantially the same time. For example, as illustrated in FIG. 3, the uppermost optical element 164 is shown at three different tilt angles $\alpha'_1$, $\alpha'_2$, $\alpha'_3$ relative to plane 196 perpendicular to the central focal axis 200 of EVO 160. Tilt angle $\alpha'_1$ directs a corresponding incoming ray 180 onto focal plane FP1 to contribute to providing EVO 160 with a first focal length f1; tilt angle $\alpha'_2$ directs the ray onto focal plane FP2 to contribute to providing the EVO with a second focal length f2, and tilt angle $\alpha'_3$ directs the ray onto focal plane FP3 to contribute to providing the EVO with a third focal length f3. Others of optical elements 164 are tilted at appropriate angles depending on their location relative to central optical axis 200 so as to direct the corresponding light rays onto the corresponding focal planes FP1-FP3 in simultaneous succession so that the overall effect of moving the necessary ones of the optical elements is to provide EVO 160 with, effectively, discrete focal lengths f1-f3. Again, the same principles are applicable to finite-conjugate optical configurations with image planes substituted for the focal planes, without loss of generality.

In this manner, EVO 160 of the present invention may be reconfigured to simulate, e.g., three conventional optical elements having focal lengths f1-f3 or a single conventional compound optic system containing a plurality of conventional optical elements capable of being focused at discrete focal lengths f1-f3 or at corresponding multiple image planes. As those skilled in the art will readily appreciate, the focus of EVO 160 at each focal length f1-f3 is achieved in a manner similar to a conventional fixed-focus Fresnel optic of the same focal length. Hence, EVO 160 may be characterized as a variable focus Fresnel-type optic. Even though EVO 160 has been illustrated as having three discrete focal lengths f1, f2, f3, optical elements 164 may be moved in a manner that provides the EVO with any number of discrete focal lengths desired so as to define a corresponding number of focal (or image) planes having any desired spacing therebetween.

The particular ones of optical elements 164 shown in FIG. 3 are shown as tilting about local axes that are parallel to axis X of FIG. 2. This is so because these optical elements 164 lie in the YZ plane and the central focal points CFP1-CFP3 of focal planes FP1, FP2, FP3, respectively, lie along axis Z. Thus, optical elements 164 shown in FIG. 3 in connection with this scenario require only a single tilt axis, i.e., local axis x. Similarly, those of optical elements 164 lying in the XZ plane require only a single tilt axis, local axis y for this scenario. However, those skilled in the art will readily appreciate that with this particular rectangular array of optical elements 164 and this focusing scenario, others of the optical elements not lying along the YZ and XZ planes may require two axes of tilt, e.g., local axes x and y, to allow those optical elements to direct the corresponding rays 180 to the corresponding central focal points CFP1-CFP3. Nevertheless, as will be discussed with respect to FIG. 5A, the substitution of a polar array for this rectangular array allows each of the optical elements 164 to achieve the identical focusing scenario with only a single tilt axis per element. This vastly decreases the complexity and cost of the tilt mechanism and element addressing scheme, thereby making low-cost EVO systems feasible.

Those skilled in the art will also readily appreciate that, although optical elements 164 have been shown and described as being reflective elements, they may alternatively be refractive elements (refractors or simple windows) or refractive/reflective elements (beamsplitters), depending upon the location of electromagnetic radiation source 192 relative to focal planes FP1, FP2, FP3. Embodiments of the present invention utilizing beamsplitting elements are described below in connection with FIGS. 15-18. As those skilled in the art will readily appreciate, such beamsplitting elements may be, e.g., of the spectral type or the dichroic type, among others, depending upon the application of EVO 108.

Figure 4:
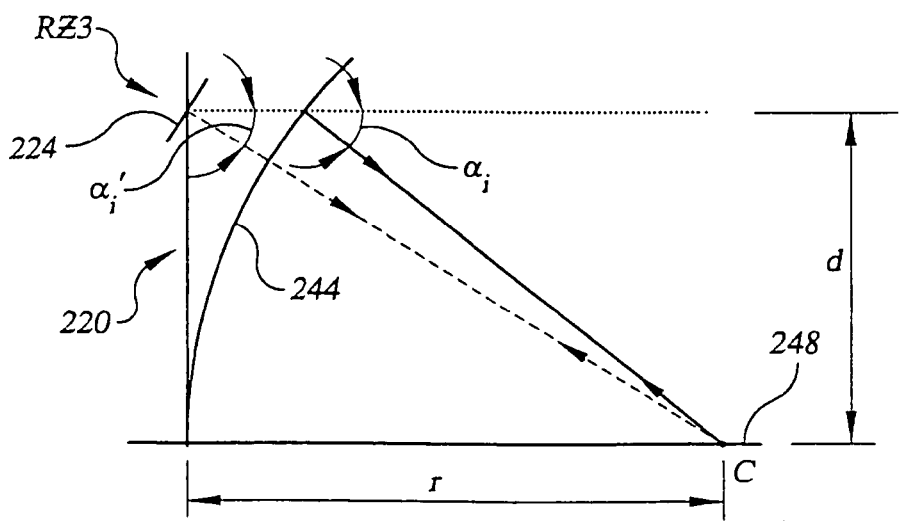
FIG. 4 is a diagram illustrating a method of controlling an EVO of the present invention to approximate a spherical reflector of desired radius of curvature r.

FIG. 4 is similar to FIG. 3, but with the EVO 220 preferably designed to approximate a spherical mirror rather than parabolic. As such, it is more suitable for sources and images near unity conjugates, rather than infinite conjugates. Because of the spherical approximation, the definition of tilt angle α and the control equation for the element tilts are slightly different from those for the parabolic approximation of FIG. 3. Nevertheless, both equations are determinative and directly applicable to rotationally symmetric EVOs comprising single-axis elements, and by extension, so are other similar equations for other rotationally symmetric surface types or portions thereof that may be desired for particular applications.

Figure 5A:
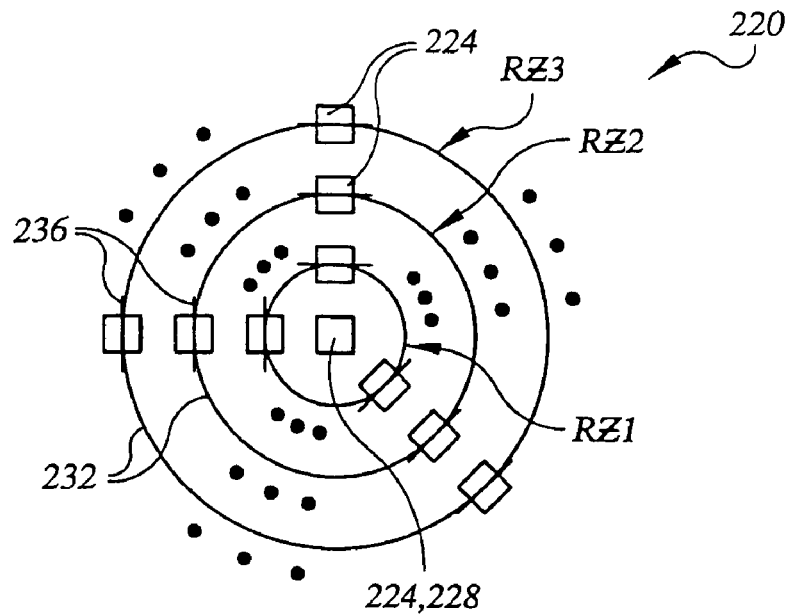
FIG. 5A is schematic diagram illustrating an EVO of the present invention that contains optical elements arranged in concentric radial zones.
Figure 5B:
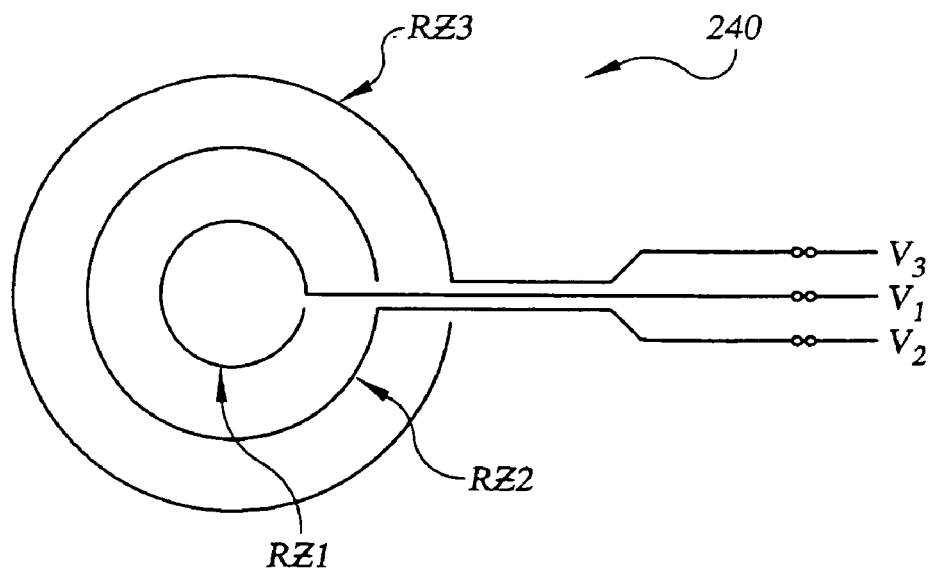
FIG. 5B is a schematic diagram illustrating an electrode addressing scheme for controlling the EVO of FIG. 5A.
Figure 10:
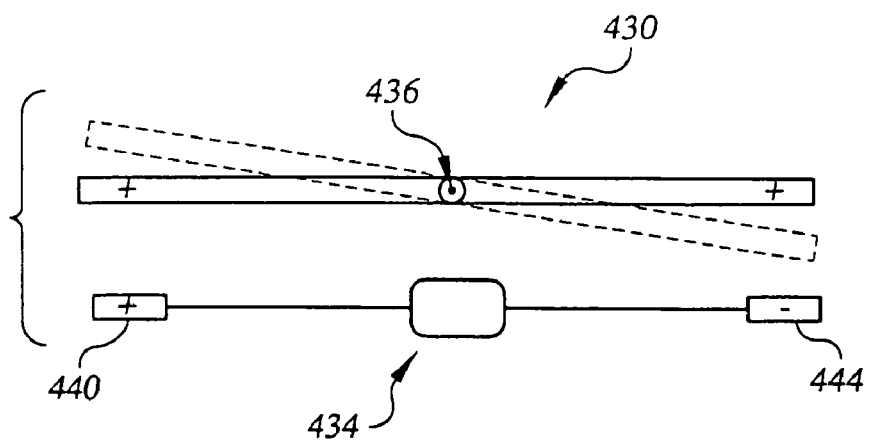
FIG. 10 is a cross-sectional view of a single-tilt-axis optical element that may be used in a variable focus system of the present invention.
Figure 11:
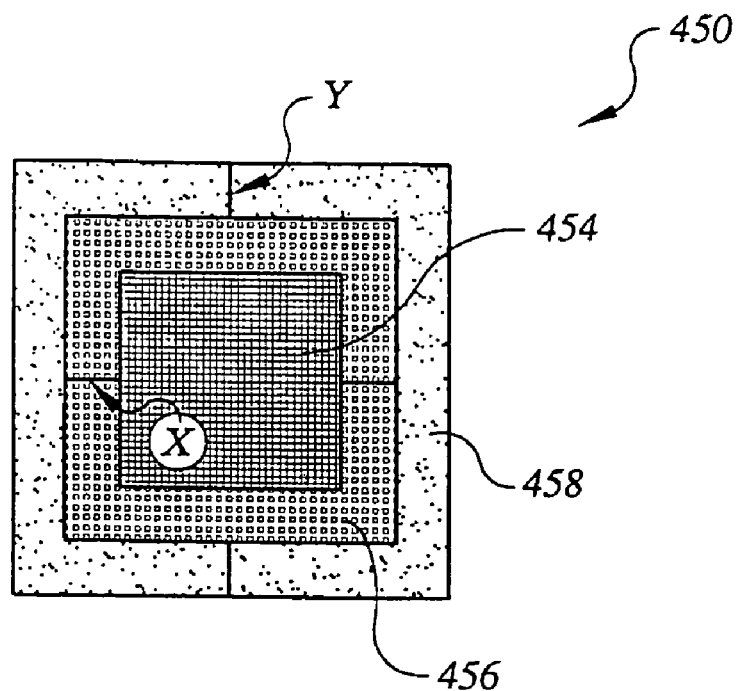
FIG. 11 is a front view of a double-tilt-axis optical element that may be used in a variable focus system of the present invention.

FIGS. 4, 5A and 5B illustrate one control scheme that controller 112 of FIG. 1 may use to control EVO 108, wherein EVO 108 is the polar/planar EVO 220 illustrated in FIGS. 4 and 5A controlled to simulate three conventional spherical reflectors having three different focal lengths. For example, as particularly shown in FIG. 5A, EVO 220 may contain optical elements 224 arranged in a "concentric" array, e.g., the polar array shown, that may comprise a central optical element 228 and a plurality of concentric rings 232 each comprising a plurality of optical elements 224. The embodiment shown in FIG. 5A is highly desirable in EVO applications since, in general, a polar array can typically better approximate conventional spherical optics than a rectangular array, and the polar array driving scheme can be far more cost-effective and practical. Depending upon the configuration of the polar array and the location of the focal planes of EVO 220 relative to the image source (not shown), optical elements 224 may need only move, e.g., tilt or flex, in one direction about a tilt axis 236 tangent to a circle touching all tilt axes of the optical elements in the same concentric ring 232, or radial zone (RZ1, RZ2, RZ3). Flexible optical elements 460, 480 of FIGS. 12 and 13 below as well as hinged and single axis tilting optical elements 164, 176 mentioned above in connection with FIGS. 2 and 3 and below in connection with FIGS. 10 and 11, are well suited to the polar arrangement of EVO 220.

Optical elements 224 may be addressed by an electrode-addressing scheme, such as the concentric ring scheme 240 illustrated in FIG. 5B. Using concentric ring scheme 240, controller 112 (FIG. 1) can be operatively configured to control reflective elements 224 in such a manner that certain tilt angles α' (FIG. 4) are induced into the respective elements in radial zones RZ1-RZ3 by applying different voltages to the different zones so as to approximate a spherical reflector, such as spherical reflector 244. Referring to FIG. 4, for a spherical reflector, tilt angle α' (relative to a horizontal axis in this case) is determined by the following equation:

$$\alpha' = \tan^{-1}(d/r) \quad \{1\}$$

wherein "d" is the radial distance of the corresponding respective radial zone RZ1-RZ3 from the central focal axis and "r" is the desired equivalent radius of curvature of EVO 220. It is noted that a similar scheme could be used to drive EVO 220 so as to approximate a parabolic reflector, such as in FIG. 3, if desired. The difference would be in the tilt angles α' and in the equation used to determine the tilt angles (which, for a parabolic reflector, can be more appropriately related to focal length than to radius of curvature). In fact, by extension, a reflective optical surface of practically any shape can also be approximated in this manner, including gratings and even unusual surfaces that cannot be readily fabricated monolithically. Of course, even though rotationally symmetric arrays have been illustrated and discussed, those skilled in the art will recognize that the same concepts are applicable to arrays that are portions of such rotationally symmetric arrangements. Thus, for example, an EVO containing only optical elements above the Z-axis in FIGS. 3 and/or 5A could approximate the well-known off-axis parabolic mirror.

When the relative magnitude of tilt angle α' (or a function thereof, such as tan α') of each element is proportional to a voltage applied thereto, an example of the voltage control of EVO 220 is as follows. If a voltage $V_i$ is applied to all optical elements 224 in radial zone $RZ_i$ located at distance $d_i$ from central focal axis 248, and if the array is so constructed that this voltage produces a tilt angle $\alpha'_i$ for each of those elements such that each element in zone $RZ_i$ directly faces point C on the central focal axis of FIG. 4, then the elements of zone $RZ_i$ form a Fresnel-type reflector having an equivalent spherical radius r, where:

$$r = d_i / (\tan \alpha'_i) \quad \{2\}$$

Adjusting voltage $V_i$ applied to corresponding respective radial zones RZ1, RZ2, RZ3 drives optical elements 124 in each zone to the appropriate tilt angles $\alpha'_i$ so as to produce the equivalent spherical radius r.

If EVO 220 is constructed such that tan $\alpha'_i$ is directly proportional to voltage $V_i$ according to the equation tan $\alpha'_i = k(V_i)$, where k is a proportionality constant, then the voltage required for radial zone $RZ_i$ will also be directly proportional to $d_i$; in fact, tan $\alpha'_i = k(V_i) = d_i/r$. Alternatively, if the angle $\alpha'_i$ is itself directly proportional to voltage $V_i$, such that $\alpha'_i = k(V_i)$, then the zonal voltage pattern $V_i (d_i)$ as a function of $d_i$ should be defined to vary with $\tan^{-1}(d_i/r)$ according to $k(V_i) = \tan^{-1}(d_i/r)$. One of these patterns may be easier to implement than the other in a particular driving scheme, but either of them or any other single-valued function may be substituted to accommodate specific array and/or electronics characteristics without compromising the essence of the invention.

Once the concept of producing an EVO having a desired equivalent spherical radius of curvature r (or equivalently, a desired focal length f) is understood, it is a simple matter to modify the voltage pattern to produce other values of r (and therefore different effective focal lengths) in the same EVO.

The fact that this optical power may be varied extremely rapidly is an important feature for creating 3D images from rapidly varying 2D displays, among other applications.

Of course, similar concepts apply to non-spherical equivalent shapes without loss of generality. Furthermore, non-polar EVOs are also possible, though potentially more complex and expensive.

Figure 6:
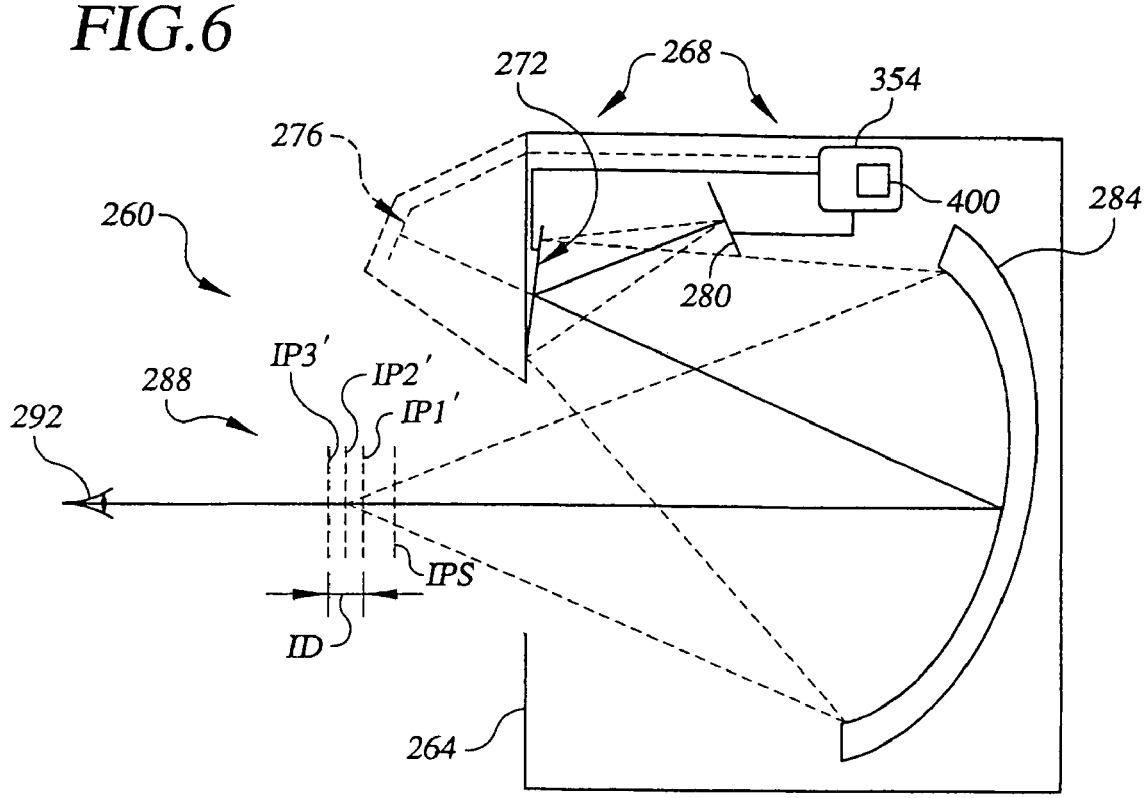
FIG. 6 is a schematic diagram of a 3D floating image projector that includes a variable focus system of the present invention similar to the variable focus system of FIG. 1.

FIG. 6 illustrates a 3D floating image projector 260 of the present invention that includes a housing 264 that contains a variable focus system 268 similar to variable focus system 100 of FIG. 1. Image projector 260 may be desirable over other floating image projectors disclosed herein, e.g., projectors 500, 600 of FIGS. 14 and 17, in certain applications due to its relative ease of fabrication. This ease of fabrication is due, in part, to the folding of the optical path within housing 264 that allows EVO 272 of projector 260 to be relatively small and planar, as opposed to large and curved. These two characteristics of EVO 272 can significantly reduce the cost of the entire 3D floating image projector 260, particularly when the EVO is the highest cost component of the projector. Optionally, if EVO 272 is embodied as a beamsplitter-type rather than solely a reflector-type, projector 260 may include a secondary image source 276. In an embodiment utilizing secondary image source 276, the image(s) provided by the secondary image source may, e.g., be projected onto a single secondary image plane IPS floating in free space, while the primary image planes IP1', IP2', IP3', of the 3D image formed from primary image source 280 may be projected in front of and/or behind the secondary image plane.

As mentioned above, 3D floating image projector 260 of FIG. 6 allows EVO 272 to be formed on a relatively small substrate having a planar surface, thereby making it easier to produce. Planar EVO 272 may be used together with a conventional curved optic 284, which may be a conventional fixed-focus optic, to produce a very significant 3D image depth (ID). An example is discussed below in which image depth ID is about 2 inches, more or less, depending on the specific application, while keeping the range of tilt angles of the optical elements (not shown) of EVO 272 within a relatively narrow range, e.g., within ±3°. Of course, as those skilled in the art will readily appreciate, the configuration of 3D floating image projector 260 may be optimized for larger or smaller EVO arrays and/or for greater or lesser image depths with other optical element tilt angle ranges. In this type of configuration, for a desired combined optical power, the required range of tilt angles for the optical elements typically decreases as the size of the array increases (thereby making EVO 272 easier to fabricate), and vice-versa. The optical designer must achieve an optimum balance of this property against the required image quality, size, viewing angle, cost and other factors, of 3D floating image projector 260.

The angle through which each optical element tilts is generally an important parameter. Although a large available angle would permit a very wide range of optical powers to be achieved, in the context of MEMS and similar technologies, the integrity of the EVO array could be impacted if the empty space required in the microlayers used to form the array should become too large. Furthermore, too large an angle could necessitate undesirably expensive control nonlinearity, and/or could result in less precise or more expensive angular control. Thus, a relatively small angle, e.g., no more than a few degrees, may be desirable, depending on the size of the microelement. For example, a nominal magnitude up to ±5° may be reasonable for optical elements having diameters not exceeding a few tenths of a millimeter, and even smaller angles might be more appropriate for significantly larger elements. A designer should take these limitations into account when designing an EVO of the present invention.

Figure 7:
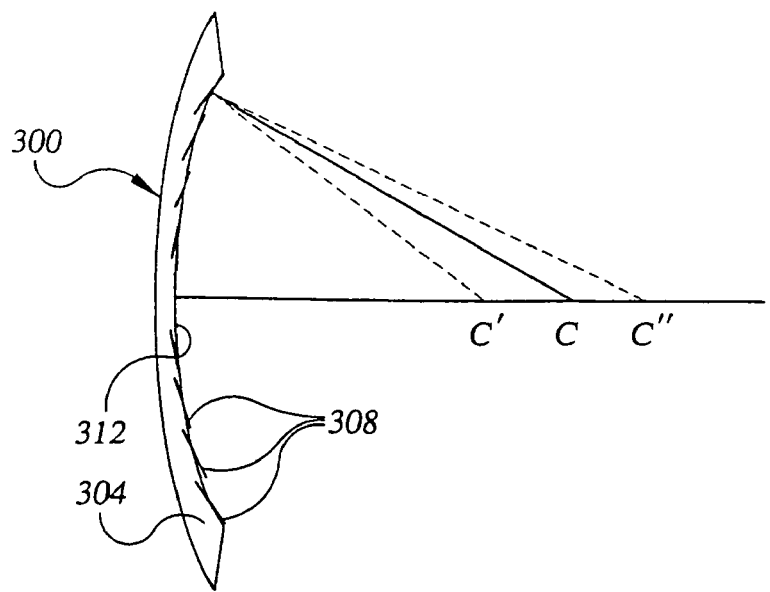
FIG. 7 is a cross-sectional view of a curved EVO of the present invention.

An advantage of a curved EVO, such as EVO 300 shown in FIG. 7, is that the angular variation of the optical elements required to achieve a desired variation in focal length is thereby reduced tremendously, because the curvature of substrate 304 provides the bulk of the optical power. This makes macroscopically useful power variations feasible on a single substrate. Similarly, in the embodiment of FIG. 6, curved optic 284, which is separated from EVO 272 in a manner similar to that employed in a Petzval or telephoto lens configuration, provides the bulk of the total optical power. This retains the advantage of needing only weak power (and consequently small tilt angles) on EVO 272, while nevertheless providing a substantial variation in the optical power of the combination.

Following is a description of a specific example of 3D floating image projector 260 of FIG. 6 provided to illustrate in further detail various aspects of the present invention. In this example, EVO 272 is located 7 inches (17.78 cm) from image source 280 and 24 inches (60.96 cm) from curved optic 284, which has radius of curvature of 31 inches (78.74 cm). Accordingly, the nominal floating image position (IP2') (i.e., with the EVO set as a flat mirror) is 31 inches (78.74 cm) from the vertex of the curved optic. Other floating image positions may be created simply by varying EVO 272. For example, by changing its effective equivalent spherical radius r from flat (i.e., r=∞) to r=100 inches (254 cm) (convex, as a diverging mirror), the image position (IP3') would be located 0.91 inches (2.31 cm) further from curved optic 284 than the nominal 31 inches (78.74 cm). Similarly, by changing the effective equivalent spherical radius r of EVO 272 to −100 inches (−254 cm) (concave, as a converging mirror), the image position (IP1') would be located 1.06 inches (2.69 cm) closer to curved optic 284 than the nominal 31 inches (78.74 cm). If the active area of EVO 272 is 7 inches×8 inches (17.78 cm×20.32 cm), then the maximum tilt angle (at the corners) of the elements of the EVO array is α'=±3.042°, and the other elements would tilt correspondingly less in conformance with the equation $\alpha'_i = \pm\tan^{-1}(d_i/100)$, where $d_i$ is the distance of the element from the EVO axis expressed in inches.

In this example, a simple image region 288 containing the three image planes IP1', IP2', IP3' mentioned above can be imagined, with the center plane IP2' located at the nominal image plane (EVO 272 in a flat configuration), the front plane IP3' located 0.91 inches (2.31 cm) closer to viewer 292 (effective equivalent spherical radius r=100 inches (254 cm)), and the rear plane IP1' located 1.06 inches (2.69 cm) behind the nominal image plane (effective equivalent spherical radius r=−100 inches (−254 cm)), for a total image depth ID of 1.97 inches (5.00 cm). (This example ignores optional additional image source 276 shown in FIG. 6.) If each element in the optical element array of EVO 272 is capable of tilting to a tilt angle α' up to ±3.042° from its nominal flat orientation by the application of a voltage difference, and if the control function to create the tilt $\alpha'_i$ at any zonal region i is given by the equation:

$$V_i = 10 \tan \alpha'_i \quad \{3\}$$

wherein $V_i$ is voltage in volts for zonal region i, then the maximum voltage difference required to produce the full ±3.042° deflection at the corners of the rectangular EVO array is ±531.5 millivolts. The other elements then require correspondingly lower voltages in conformance with Equations {3} and {2}, above. Of course, other equations may apply if the particular construction of EVO 272 requires higher voltages and/or a nonlinear voltage pattern to achieve the desired angular tilts in each zone. It is noted that effective equivalent spherical radius r is not restricted only to the three values −100 inches, ∞, and +100 inches, but may take on any desired value larger than ±100 inches in this example, thereby producing images at any desired plane within the 1.97 inch (5.00 cm) image depth ID of image region 288.

A control methodology for creating 3D images from a series of 2D images by means of projecting 2D images with the aid of EVO 272 is to synchronize the EVO to image source 280 such that when the image source displays a 2D image containing the content appropriate to a corresponding one of image planes IP1', IP2', IP3', the EVO is set to the appropriate effective equivalent spherical radius r that projects that 2D image onto that plane. Then, the next 2D image displayed by image source 280 contains content appropriate to the next image plane of planes IP2', IP3', IP1', respectively. When the image source displays the next image, EVO 272 is set to an effective equivalent spherical radius r that produces the image at that next image plane of planes IP2', IP3', IP1', and so forth, throughout image region 288. When the last image plane IP3' of image region 288 is reached, the next image cycles back to first image plane IP1'. The foregoing description assumes that the cycle is IP1'=>IP2'=>IP3'=>IP1'=>IP2' and so on. However, those skilled in the art will appreciate that the order of the focusing of 2D images on image planes IP1', IP2', IP3' may proceed in any order desired as long as each 2D image is projected onto the appropriate respective image plane. For example, alternative focusing orders include IP3'=>IP2'=>IP1'=>IP2'=>IP3', and so on, and IP1'=>IP2'=>IP3'=>IP2'=>IP1'=>IP2', and so on. However, some orders such as these may be less desirable, as will be discussed later.

Figure 8:
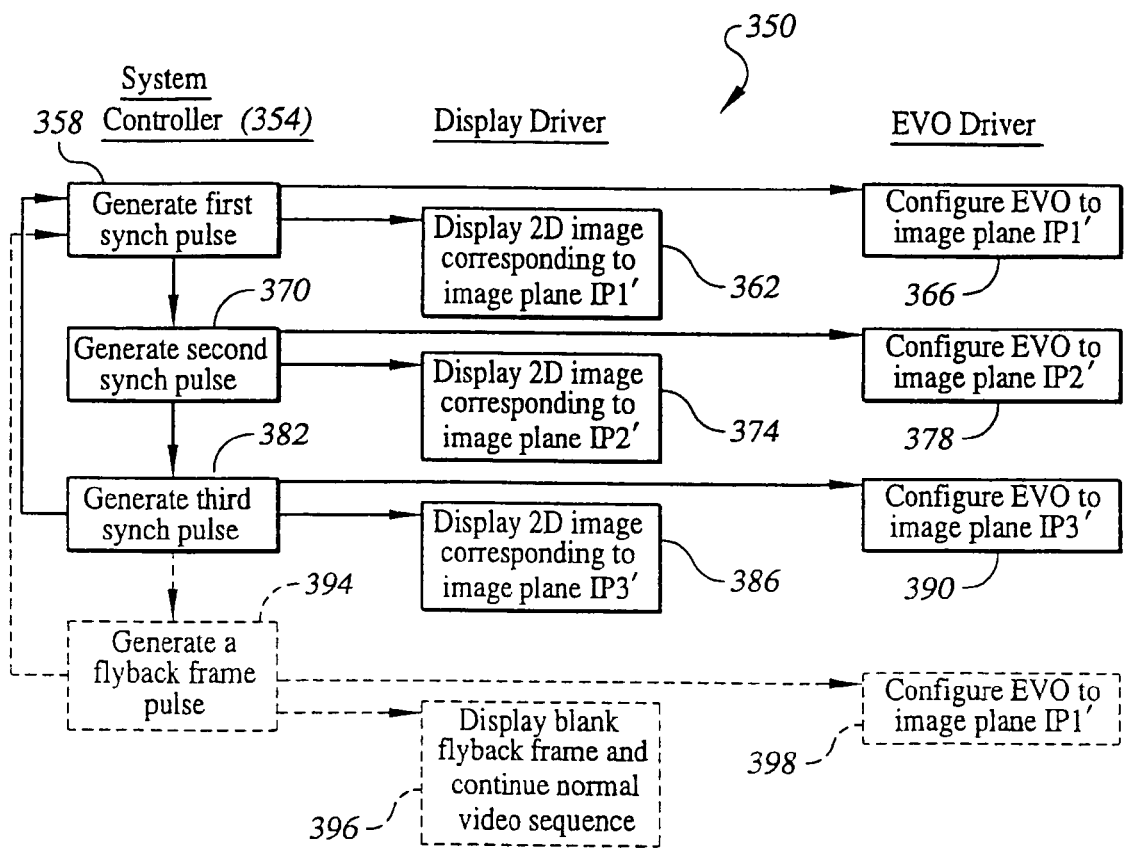
FIG. 8 illustrates a method of controlling the EVO of FIG. 1 through FIG. 5 and/or FIG. 7 in a configuration such as that of FIG. 6, for example, so as to focus a series of 2D images onto three corresponding respective image planes, then returning to the first plane and continuing the process.

One possible control scheme would be to require EVO 272 to remain focused at a single effective equivalent spherical radius r during the entire period that image source 280 displays the corresponding 2D image, then to rapidly transition to the next required effective equivalent spherical radius r between images, remaining at that value for the entire next image. This "square wave" control scheme is illustrated in method 350 of FIG. 8. Referring to FIGS. 6 and 8, method 350 may be executed by system controller 354 so as to send appropriate timing signals to image source 280 and EVO 272. It is noted that in this example, image source 280 and EVO 272 are assumed to contain their own drivers (not shown) capable of responding effectively to a timing signal. Of course, in other embodiments, system controller 354 may include the appropriate drivers for driving image source 280 and EVO 272, such that the signals generated by controller 354 and sent to image source 280 and EVO 272 are control signals rather than timing signals. Those skilled in the art will understand how to implement the present invention in such alternative control configurations. Regardless of where the drivers for image source 280 and EVO 272 are located, the general principles of method 350 may be used.

At step 358 in FIG. 8, system controller 354 sends a first sync pulse to both the respective drivers of image source 280 and EVO 272. In response to the first sync pulse, at step 362, the image source driver causes image source 280 to display a 2D image corresponding to image plane IP1'. Correspondingly, at step 366, the EVO driver responds to the first sync pulse by setting EVO 272 to the effective equivalent spherical radius $r_1$ corresponding to IP1' so as to project the 2D image onto image plane IP1'. Next, at step 370, system controller 354 sends a second sync pulse to the image source driver and EVO driver. At step 374, the image source driver responds to the second sync pulse by causing image source 280 to display a 2D image corresponding to image plane IP2'. Correspondingly, the EVO driver responds at step 378 to the second sync pulse by setting EVO 272 to the effective equivalent spherical radius $r_2$ corresponding to IP2' so as to project the 2D image onto image plane IP2'. Then, at step 382, system controller 354 sends a third sync pulse to the image source driver and EVO driver. At step 386, the image source driver responds to the third sync pulse by causing image source 280 to display a 2D image corresponding to image plane IP3'. Correspondingly, the EVO driver responds at step 390 to the third sync pulse by setting EVO 272 to the effective equivalent spherical radius $r_3$ corresponding to IP3' so as to project the 2D image onto image plane IP3'. (Here, the subscripts of r refer to different curvature states, not to zones.)

At this point, method 350 may simply loop back to step 358, whereby the cycles of steps 358-390 are repeated for either the same 2D images if the 3D image is a static image, or, typically, the next frame if the 3D image is dynamic image, such as a video image or movie. It is noted that the source of the 2D images, e.g., a digital image file, may include synchronizing information for ensuring that the 2D images of each 3D frame are displayed with one another on the available image planes, e.g., image planes IP1', IP2', IP3'. Depending upon the design of EVO 272 and the robustness of the control scheme, it may be desirable that system controller 354 generate a flyback frame pulse (step 394), which causes image source 280 to display a blank flyback frame at step 396 that accounts for what may be a relatively long delay in refocusing EVO 272 from image plane IP3' back to IP1'. For example, in the example discussed above relative to FIG. 6, EVO 272 is required to transition from a concave configuration to a convex configuration when refocusing from image plane IP3' back to IP1'. Due to the relatively large changes in tilt angles α' required for this transition, and possible additional settling time, providing of a flyback frame may be useful. Generally, providing a flyback frame will typically not be necessary for robust control systems, but rather is illustrated as a way to accommodate less stringent tolerances in lower cost systems. Simultaneously, at step 398, EVO 272 may be driven to reconfigure to its configuration for focusing at image plane IP1'.

Method 350 may be performed within system controller 354 via software 400 that generates the synchronizing pulses that ultimately control image source 280 and EVO 272. In this connection, software 400 may utilize individual image and/or frame information present within or accompanying the image signal that drives image source 280 for ensuring that each 2D image from the image signal is projected onto the proper image plane. Such information may be, e.g., encoded into an image signal or accompanying audio signal, if any, or provided as a separate unencoded signal present "alongside" the image signal and audio signal, if present. Those skilled in the art will understand how to implement and utilize such image and/or frame information such that a detailed description is not necessary herein.

Method 350 just described is suited to controlling EVO 272 using a square wave voltage signal so as to cause rapid transitions between effective equivalent spherical radii r (or more generally, curved surfaces of focal length f). This would clearly create distinct image planes orthogonal to the projection direction, and would be an excellent approach for implementing the necessary EVO control. However, the need to transition between stable states during the extremely short inter-frame interval could impose a difficult burden on the control electronics, which could then become unduly expensive.

A more cost-effective control scheme for low-cost 3D projectors or displays can be to adjust the effective equivalent spherical radius r (or more generally, curved surface of focal length f) using a voltage signal having a waveform that varies more gradually than a square wave, such as a sawtooth wave, so that the EVO voltage pattern is continuously varied to smoothly adjust the effective equivalent surface curvature throughout the full image region. A sawtooth wave is preferable to a simpler oscillatory function such as a sine wave, because the sawtooth wave can maintain near-constant spatial image separation between the image planes, and because it can maintain nearly identical temporal spacing between successive frame instances of each of the image plane locations. (Thus, with a sawtooth waveform, the time duration between the first and second frame display at image plane IP1' can be essentially the same as the time duration between the first and second frame display at plane IP2', and so on.) Simple sine wave oscillations of the voltage signal would not exhibit these advantages, and would therefore produce a less desirable 3D image with much more noticeable flicker variation between the image planes, which could be overcome only by increasing the frequency significantly.

As in method 350 discussed above, a flyback period corresponding to a single-frame transition from one extreme of the surface curvature to the other may be used if needed with the sawtooth waveform. Utilizing a continuously variable waveform such as a sawtooth may have a minor impact on the orthogonality of the individual image planes to the projection direction, but it can make the control electronics much more reliable and less costly. Nevertheless, the invention is not limited to a particular type of control scheme.

Figure 9:
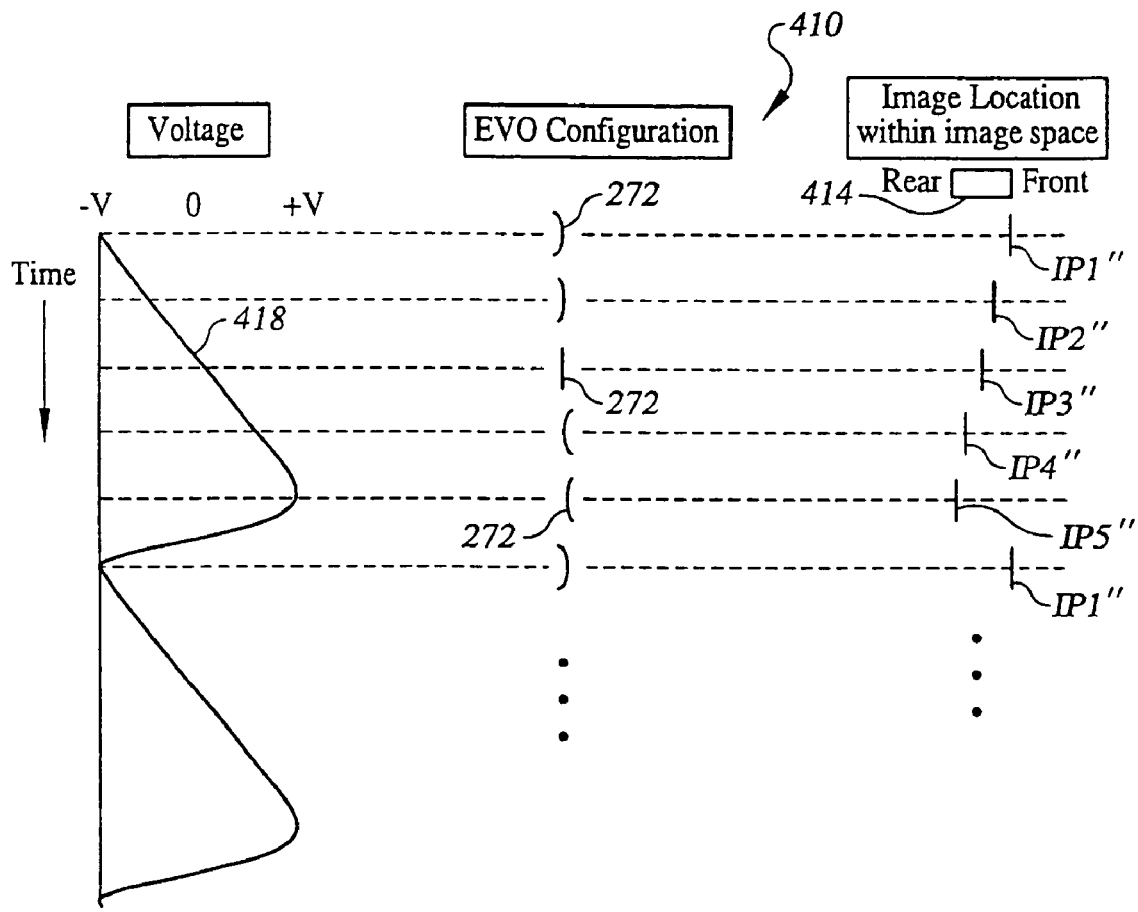
FIG. 9 illustrates an alternative method of controlling an EVO of FIG. 1 through FIG. 5 and/or FIG. 7 in a configuration such as that of FIG. 6, for example, so as to focus a series of 2D images onto five corresponding respective image planes.

An alternative refocusing method 410 compatible with projector 260 of FIG. 6, or other system containing an EVO of the present invention, and utilizing a sawtooth voltage waveform, is illustrated in FIG. 9. In method 410, image region 414 depicts five image planes IP1" through IP5" and EVO 272 varies in configuration from a convex shape corresponding to image plane IP1" to a concave shape corresponding to image plane IP5". Those skilled in the art will appreciate that although refocusing method 410 and the detailed example of projector 260 presented above in connection with FIG. 6 illustrate EVO 272 as transitioning between convex and concave configurations, the EVO does not need to make this complete reversal of curvature. Rather, all configurations of EVO 272 for a particular embodiment of projector 260 may be all concave, all convex, only flat and concave or only flat and convex, depending upon the particular design parameters. For the sake of clarity, only the configuration of EVO 272 and image planes IP1"-IP5" are shown alongside a typical sawtooth waveform 418 representing the voltage applied to the elements in a selected EVO zone (e.g., the outermost). Those skilled in the art will further appreciate that, as previously mentioned, the image planes will actually be somewhat tilted due to the continuous nature of the sawtooth waveform, and that as time progresses, the "lower" (in the figure), i.e. later, spatial portion of any chosen image plane, for example, IP1", will approach the "upper" or initial spatial portion of the following image plane. The "EVO Configuration" and "Image Location" columns in FIG. 9 are to be interpreted as instantaneous snapshots of conditions at the moment the continuous "Voltage" waveform reaches the value depicted at each dotted line in FIG. 9.

As the voltage increases from its negative extreme of waveform 418 through zero to its positive extreme, the configuration of EVO 272 changes from concave to flat to convex, causing the focused image to move from the front image plane IP1" through three intermediate image planes IP2", IP3", IP4" to the rear image plane IP5" of image region 414. During a flyback period, the voltage rapidly returns to the negative extreme, and the process is repeated as the 2D image from image source 280, such as a 2D display, are presented to EVO 272 for focusing on the corresponding respective image planes IP1"-IP5". If the period of the waveform 418 is short enough in time (e.g., 30 milliseconds or shorter), the eye perceives all images in image region 414 as appearing simultaneously. Longer periods are less desirable, since they correspond to increased perception of flicker.

When EVO 272 is synchronized to an image source (e.g., image source 280 as in FIG. 6) that is sufficiently fast, a large enough number of suitably tailored individual 2D images can be formed throughout image region 414 (equivalent to image region 288 in FIG. 6) within the period of waveform 418 to cause the eye to perceive the ensemble as an approximately continuous 3D image. (Five frames per period are depicted in FIG. 9, but many more may be envisioned.) Small variations in the content of the image source (which are projected as small variations in the content of the image region 414) from period to period can then be introduced so as to cause apparent motion in the 3D scene, just as small variations in successive 2D cinematic film or video frames cause the perception of 2D motion.

FIGS. 10-13 illustrate several different types of optical elements presently contemplated for various embodiments of an EVO of the present invention. FIG. 10 illustrates a tilting optical element 430 that is tilted using an electrostatic actuator 434. A tilt axis 436 of optical element 430 is normal to this figure. If optical element 430 has two tilt axes for the reasons discussed above, the other tilt axis (not shown) may lie along a horizontal line extending through tilt axis 436. Optical element 430 may be composed of a material (e.g., silicon if the element is a reflective element) that is heavily doped to provide it with an electric charge. Accordingly, actuator 434 may include one or more electrodes 440, 444 affixed to a substrate (not shown), or other support(s) affixed to the substrate, for receiving appropriate electrostatic charges for causing optical element 430 to tilt. For example, by providing electrodes 440, 444 beneath optical element 430 with equal and opposite voltages, one side of the optical element is attracted to one electrode, while the other side is repelled from the other electrode.

Other schemes are also feasible. For example, the second electrode, e.g., electrode 444, may be located above optical element 430, on the same or opposite side of the element, the signs of the voltages may be the same instead of opposite, and if the element material is sufficiently stiff, only a single electrode may be needed, among others. The same concepts, of course, extend to an optical element having two tilt axes. In addition, instead of being pivotable about a central portion, each optical element 430 may be hinged at one end.

Examples of tilting electrostatically actuated optical elements suitable for use in an EVO of the present invention include the micromirror elements disclosed in U.S. Pat. Nos. 4,662,746, 5,061,049, 5,083,857 and 5,600,383 assigned to Texas Instruments, Inc. (TI) and directed to TI's digital light processor (DLP) technology. These TI patents are incorporated by reference herein in their entireties. One alternative to using electrostatic actuators to move optical elements is to use one or more piezoelectric actuators (not shown) that extend between a substrate and each optical element. As those skilled in the art will readily appreciate, as a voltage applied to each piezoelectric actuator varies, the "length" of the actuator, i.e., the dimension of the actuator extending between the substrate and the optical element, changes accordingly. The piezoelectric actuator(s) could then be placed accordingly so that the changes in length cause a change in tilt of the optical element. Other actuator types may also be used without departing from the spirit, scope, and intention of the invention.

FIG. 11 shows an alternative two-axis tilting-type optical element 450 suitable for use in an EVO of the present invention. Optical element 450 is different from optical element 430 of FIG. 10 in that optical element 430 of FIG. 10 is a monolithic optical element, whereas optical element 450 of FIG. 11 includes three discrete portions, i.e., a central portion 454, an intermediate portion 456, and a peripheral portion 458 that supports the central and intermediate portions. Peripheral portion 458 may be, in turn, supported by a substrate, such as substrate 184 described above in connection with FIG. 3. Central portion 454 may tilt about axis x, while intermediate portion 456 may tilt about axis y. If intermediate portion 456 supports axis x and peripheral portion 458 supports axis y, the overall effect is that central portion 454 may be tiltable about either or both of axes x and y. If intermediate portion 456 is fully or partially reflective or transparent, then a uniaxial tilt of the intermediate portion may be achieved simultaneously with a dual-axial tilt of central portion 454 to achieve multiple optical effects simultaneously. Alternatively, intermediate portion 456 may be empty (except for axis x which connects portion 454 to portion 458), or it may be opaque.

Central portion 454, intermediate portion 456, and peripheral portion 458 may be, e.g., non-reflective, diffuse, opaque, reflective, refractive, or transparent. If, e.g., peripheral portion 458 and/or intermediate portion 456 are transparent and central optical portion 454 is reflective, optical element 450 can act as a beamsplitter with a relative reflective/transmission (R/T) efficiency depending on the ratio of the areas of the central optical portion and the transparent portion(s), with any opaque, diffuse or non-reflective portion representing a loss. Conversely, if peripheral optical portion 458 is opaque and intermediate portion 456 is opaque, transparent, or otherwise non-reflective while central portion 454 is reflective, optical element 450 would be a mirror, and it would be advantageous to make the fill factor (i.e., the relative area of the central portion to the total area of all three portions) as high as feasible. If, e.g., one of peripheral portion 458 or intermediate portion 456 reflective while the other is transparent, and central optical portion 454 is also reflective, optical element 450 becomes a new type of beamsplitter, with the reflective portions reflecting in different directions. By appropriately controlling the tilt angles of a plurality of reflective optical elements 450 while in an array (see, e.g., FIG. 2), an EVO may be made into a reflective mirror having two or even three focal lengths (see, e.g., FIG. 3) simultaneously with one another. For example, one focal length defined by the plurality of central portions 454 in the array could be electrically variable, while another focal length defined by the plurality of peripheral portions 458 could be fixed, e.g., when the array is mounted on a curved substrate. An additional variable cylindrical (or toric, on a curved substrate) focal length could also be defined by the plurality of intermediate portions 456. Such a multi-powered optic could, e.g., be used to make the same image appear to reside in multiple image planes at once. This capability can be further amplified or otherwise refined by subsequent optical re-imaging.

Figure 12:
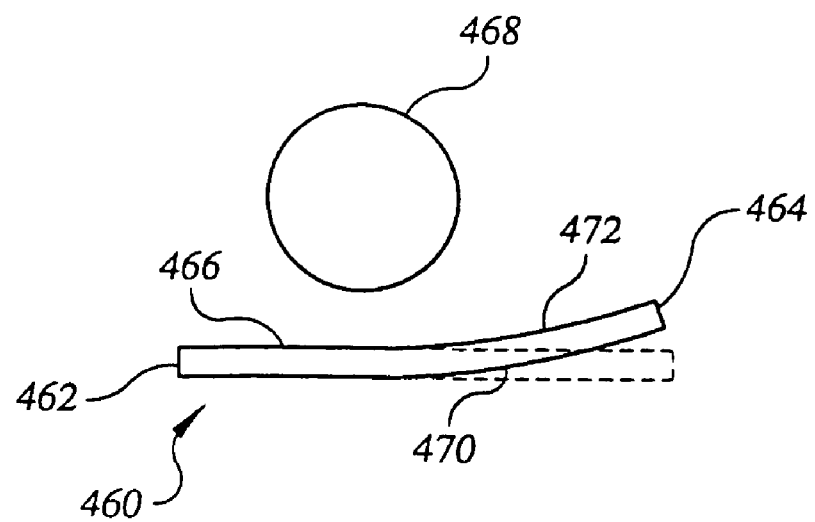
FIG. 12 is a side view of a flexible optical element that may be used in a variable focus system of the present invention.
Figure 13:
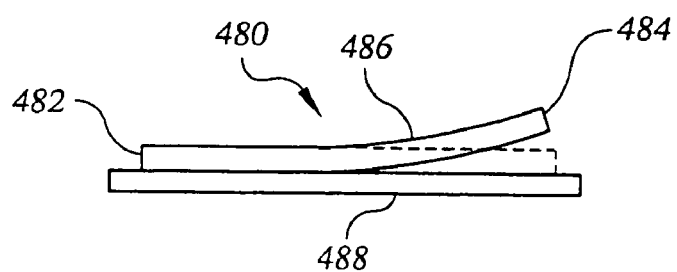
FIG. 13 is a side view of an alternative flexible optical element that may be used in a variable focus system of the present invention.

FIGS. 12 and 13 show, respectively, two optical elements 460, 480 that are alternatives to the tilting-type optical elements 430, 450 described above in connection with FIGS. 10 and 11. Rather than being of the flat tilting, i.e., pivoting, hinged or gimbaled, type discussed above, optical elements 460, 480 of FIGS. 12 and 13 may be characterized as flexible optical elements, since one end 462, 482 of each optical element is fixed relative to a substrate (not shown) and one end 464, 484 of optical elements 460, 480 is free to move, within certain limits, in a direction toward and away from the substrate. Optical elements 460, 480 are generally similar to the flexible elements disclosed in U.S. Pat. Nos. 6,317,108, 6,057,814, 3,989,357 and 3,897,997. Therefore, these patents are incorporated by reference herein in their entireties.

Referring particularly to FIG. 12, optical element 460 includes a flexible electrode 466 that may be charged with an electrical field, e.g., by a charging circuit (not shown). Details of forming flexible electrode 466 are discussed in one or more of the foregoing patents and, therefore, need not be described in detail. However, as is now described, flexible electrode 466 may be controlled in substantially continuous analog manner allowing multiple states, rather than in the digital two-state "on/off" manner envisioned in the foregoing patents. A fixed actuator electrode 468 is fixed relative to the substrate and is charged with an electrical field, e.g., by a charging circuit, so as to attract or repel free end 464 of flexible electrode 466 to change the position of the free end. Flexible optical electrode 466 may be moved to a plurality of discrete flex angles by controlling the electrical field strength between the flexible optical electrode and fixed electrode 468. The result of varying this field strength is to cause flexible electrode 466 to flex to a stable flex angle, wherein the precise flex angle depends on the precise voltage difference between electrodes 466, 468.

If optical element 460 is a reflective electrode, e.g., wherein one of surface 470, 472 of flexible electrode acts as a mirror or is provided with one or more coatings that make flexible electrode 466 reflective, the change in position of free end 464 of the flexible electrode is generally equivalent to the tilting of optical elements 164, 224, 430, 450 of FIGS. 2-4, 10 and 11, respectively. That is, when a plurality of optical elements 460 are arranged to form an EVO, e.g., EVO 160 of FIG. 2, the focal length of the EVO may be changed by suitably varying the electrical fields in the corresponding fixed electrodes 468 and/or corresponding flexible electrodes 466 to cause each optical element, for example, to reflect rays incident that optical element to a common focal plane.

Fixed electrode 468 may be any suitable shape, such as the cylindrical shape shown. A simple example of a reflective-type flexible optical electrode comprises a resilient polymer electrode that is metal-coated on at least one of surface 470, 472. In this connection, depending upon a particular application and materials of construction, either surface 470, 472 of flexible electrode 466 may generally face the plurality of focal planes via which a 3D image is generated. That is, fixed electrode 468 may be on either side of flexible electrode 466 relative to the focal planes of the EVO. Flexible optical element 480 of FIG. 13 is similar to optical element 460 of FIG. 12, except that flexible electrode 486 is fixed at one end to fixed electrode 488 (possibly with an insulating dielectric layer in the connection region), rather than being unattached to the fixed electrode as shown in FIG. 12. Similar to tilting optical elements 164, 224, 430, 450 of FIGS. 2-4, 10 and 11, respectively, flexible optical elements 460, 480 of FIGS. 12 and 13 may be actuated, preferably by an electrostatic actuator, but alternatively by a non-electrostatic type actuator, such as a piezoelectric actuator (not shown). Such an alternative actuator may extend between each flexible "element" 486 (which may no longer be an electrode) and either the substrate or some other structure fixed relative to the substrate.

The flex angle through which optical elements 460, 480 flex between a relaxed state and an active state to provide the resulting EVO with its variable focus feature is an important parameter. A large range of flex angles may be achieved by flexible electrodes 466, 486, with sufficient control throughout the range to define multiple individual flex angles with repeatable precision. In the context of the present invention, this can translate into an EVO having a very wide range of addressable focal lengths. However, for optimum control in 3D image display applications where a number of intermediate states between the fully relaxed and fully active states is desirable, a much smaller range of flex angle may be preferable. Such smaller ranges are also compatible with the desired useful depth ranges for 3D images, in which the perceived distance in depth between successive planes may be only a fraction, e.g., 1%-10%, of the image diameter, and in which the total depth range may be comparable to or smaller than the image diameter. Nevertheless, the larger range of flex angle available with this type of microelement compared with other MEMS elements, combined with the single-axis tilt implementation discussed in connection with FIG. 5, can be used to an advantage by a designer when balancing system requirements and performance characteristics. In addition, all other things being equal, the cost of an EVO comprising flexible electrode type optical elements each with a single tilt axis can be less than the cost of an EVO comprising other types of optical elements, especially two-axis elements such as optical elements 164, 224, 430, 450 described above in connection with FIGS. 2-4, 10 and 11, respectively.

Referring again to FIG. 7, this figure illustrates reflective optical elements 308 mounted on a curved substrate 304 on the concave surface 312 thereof. This configuration is particularly suitable for providing EVO 300 with a relatively high optical power, i.e., relatively short focal lengths, because the curvature of concave surface 312 can be made to bear the burden of the bulk of the required optical power, while optical elements 308 need only provide the required degree of variability proximate that power to provide EVO 300 with a plurality of effective centers of curvature C, C', C". This potent configuration minimizes the range of angles through which optical elements must move, thereby making inexpensive and highly reliable approaches, such as electrostatic and piezoelectric activation, feasible.

Curved surface 312 is shown without loss of generality as spherical, with its center of curvature at C. As optical elements 308 are moved to their maximum negative tilt angles shown, the effective center of curvature of EVO 300 moves from C to C'. By moving optical elements 308 to their maximum positive tilt angle, the effective center of curvature of EVO 300 moves to C". The size of the variation between centers of curvature C' and C, and C and C" can be a substantial fraction of the radius of curvature C itself, limited only by the practical limits of the maximum negative and positive tilt angles of optical elements 308. Accordingly, the plurality of image planes (e.g., image planes IP1-IP7 of FIG. 1) can fall anywhere from C' to C", with the maximum number of discrete image planes being limited by the tilt angle resolution of optical elements 308. Of course, as those skilled in the art will appreciate, center of curvature C of concave surface 312 need not be intermediate the minimum and maximum effective centers of curvature C', C". Rather, center of curvature C may be at the lower or upper end of ranges such that tilt angles are only either negative or positive, as the case may be.

Furthermore, those skilled in the art will recognize that the principle illustrated in FIG. 7 also applies to convex surfaces, as well as to surface shapes other than spherical. For non-spherical shapes, the focal length of the surface may be substituted for the center of curvature, and the foregoing description in regard to FIG. 7 then applies without loss of generality.

Figure 14:
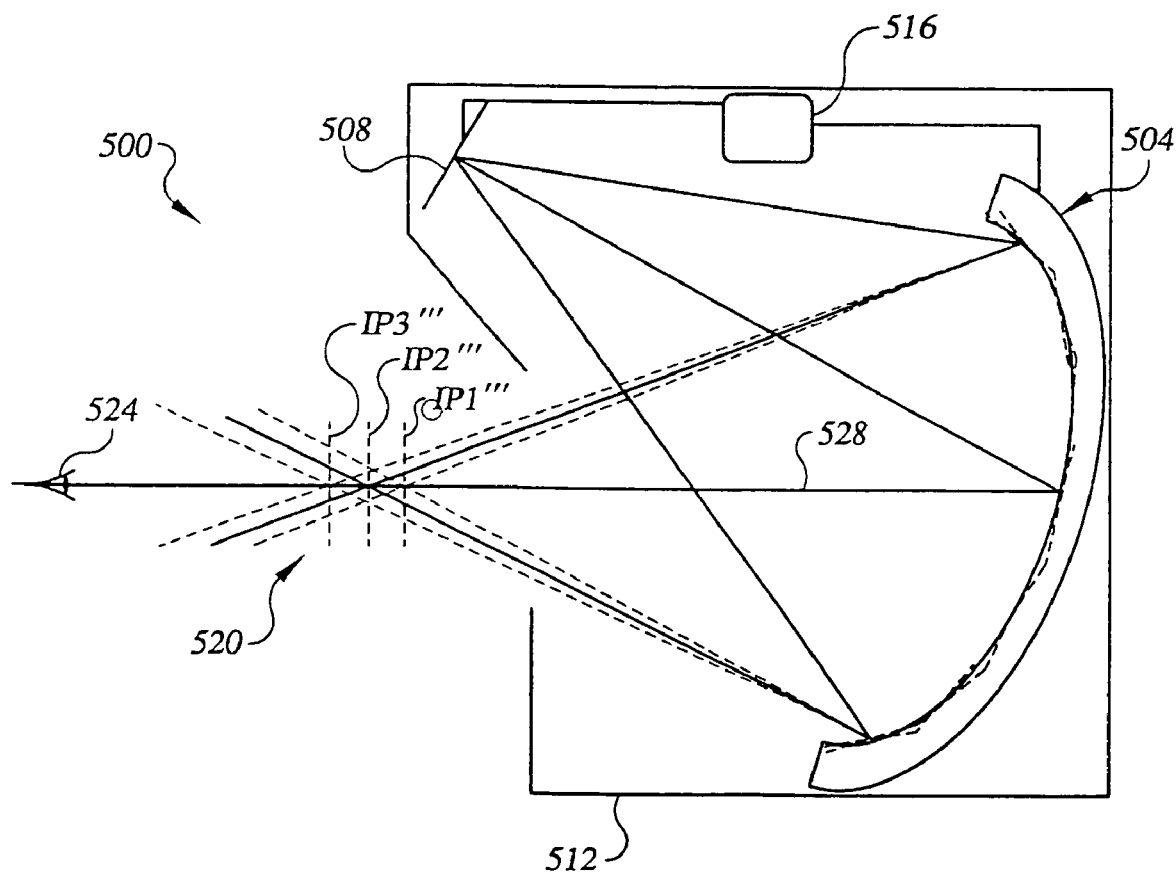
FIG. 14 is a schematic diagram illustrating an alternative 3D floating image projector of the present invention.

FIG. 14 illustrates an example of a 3D floating image projector 500 of the present invention that utilizes various capabilities of an EVO 504. In this embodiment, EVO 504 and an image source 508 may each be mounted within a housing 512. A controller 516 for controlling EVO 504 and image source 508, or the EVO alone depending upon the type of image source 508, may also be mounted within housing 512 to form an integrated system. Alternatively, controller 516 may be external to housing 512. In the latter, controller 516 may be any type of device capable of sending the appropriate control signals to EVO 504 and/or image source 508 to control these components as described above in connection with FIGS. 1 and 6, among others. For example, controller 516 may be a personal computer or a dedicated device containing the appropriate hardware, such as integrated circuits, e.g., microprocessor(s), memory, and appurtenant circuitry, and/or software for controlling EVO 504 and/or image source 508. Those skilled in the art will readily appreciate the variety of configurations of controller 516 that may be used, such that a lengthy enumeration and description of each is not necessary herein for those skilled in the art to appreciate the scope of the present invention.

In this embodiment, EVO 504 may be, e.g., of a curved reflector type, as discussed above in connection with FIG. 7, and positioned within housing 512 and controlled so that projector 500 forms a real image in image region 520 located outside the housing in free space. If image source 508 is a 2D display that displays a plurality of image slices (e.g., image slices IS1-IS7 of FIG. 1) in succession to one another in the manner discussed above in connection with FIG. 1, controller 516 may control EVO 504 to assemble these image slices into a 3D floating image fixed in free space relative to housing 512. Alternatively, rather than image source 508 being a display of image slices, it may be a 3D object that is illuminated by an illumination source (not shown). In this case, the three image planes shown, represent three imaging distances (corresponding to three different focal lengths) of EVO 504 at which the 3D object is projected. If the order of projection is, e.g., from IP1''' to IP2''' to IP3''', the real image of the 3D object will appear to viewer 524 to be moving toward him/her. On the other hand, if the order of projection is from IP3''' to IP2''' to IP1''', then the real image of the 3D object will appear to a viewer 524 to be moving away from him/her. Different control of EVO 504 by controller 516 may be used to make the real image of the 3D object to move in directions other than toward and away from viewer 524, such as in a plane perpendicular to the focal axis shown. This may be accomplished generally by not varying the power of EVO 504, but rather by varying the focal axis 528 of the EVO 504. Of course, controller 516 may control both the power and focal axis 528 of EVO 504 to make the real image appear to viewer 524 to move about free space in any direction desired.

This concept of moving an image about in free space to impart to viewer 524 that the image is moving extends to the situation wherein a 3D floating image is created from a plurality of 2D image slices from, e.g., a video display type image source 508, such as the image source described above in connection with FIG. 1. Such moving 3D floating images may be accomplished with more elaborate control of EVO 504 by changing the focus of the EVO not only to create image region 520 containing the image planes, e.g., image planes IP1''', IP2''', IP3''', corresponding to the image slices, but also to move image region 520 relative to housing 512. Similar to the real image of a 3D object discussed above, 3D floating images created from the image slices may be made to appear to viewer 524 to be moving in any direction relative to viewer 524 by moving image region 520 by varying the power and/or focal axis 528 of EVO 504.

As those skilled in the art will appreciate, the image characteristics and control capabilities discussed above in connection with the configuration of FIG. 14 apply as well to that of FIG. 6 and other image forming systems that include an EVO component.

Figure 15:
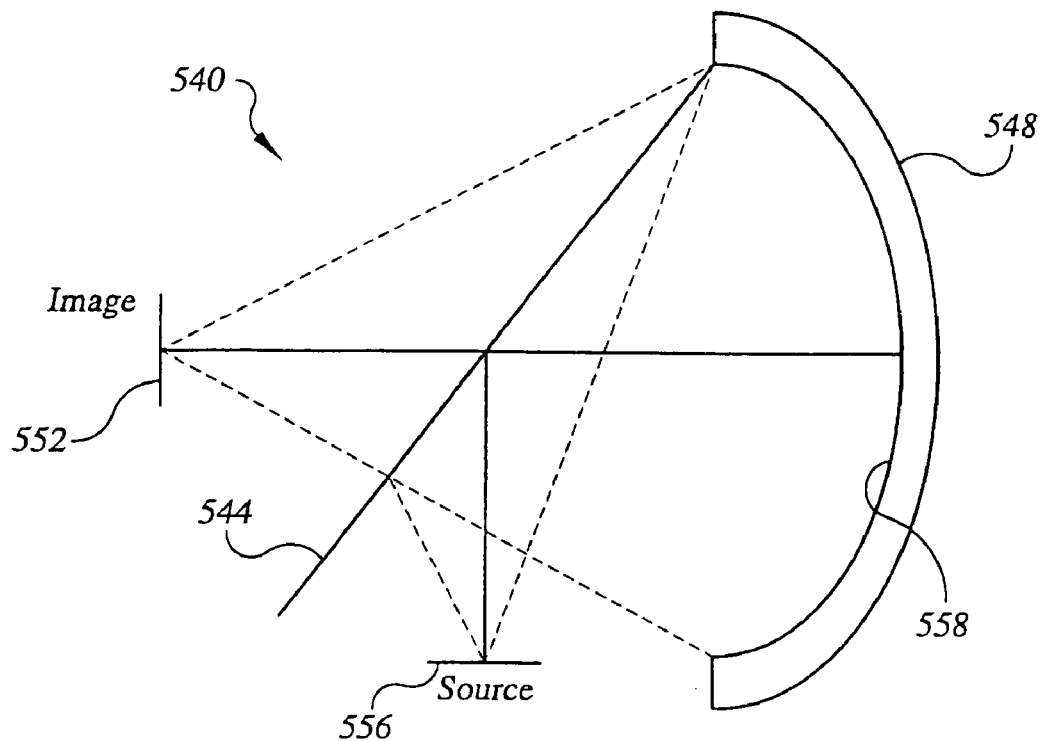
FIG. 15 is a schematic diagram of a beamsplitter EVO/fixed optic combination of the present invention that may be used to make a 3D image projector.
Figure 16:
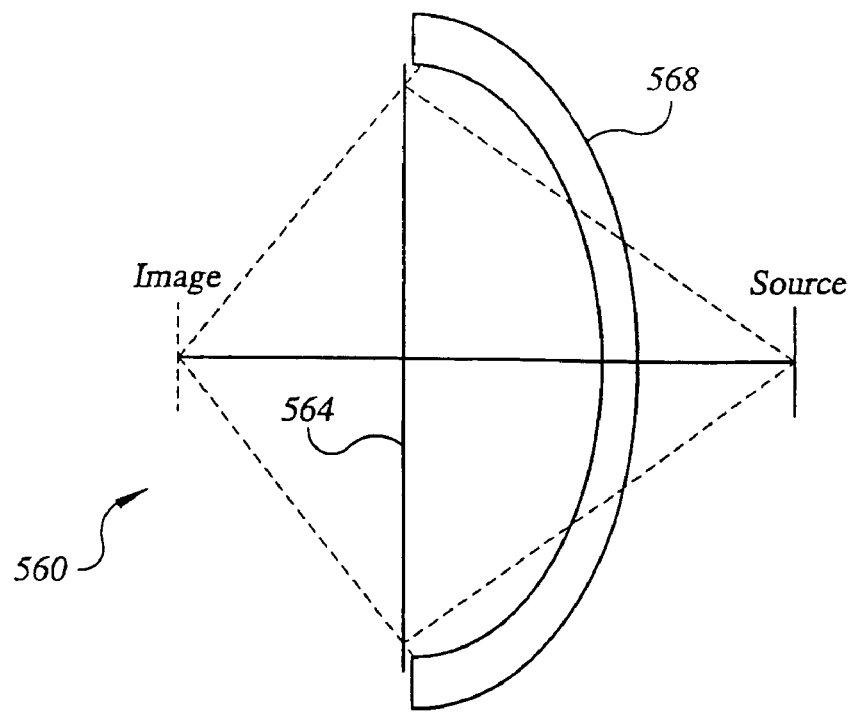
FIG. 16 is a schematic diagram of an alternative beamsplitter EVO/fixed optic combination of the present invention that may be used to make a 3D image projector.

FIGS. 15 and 16 illustrate two alternative image projectors 540 and 560, respectively, in which either a curved or flat EVO may be used to form floating images. Projector 540 of FIG. 15 incorporates a planar beamsplitter 544 and a curved optic 548. In this embodiment, each image (not shown) from image source 556 is reflected from beamsplitter 544 to curved optic 548 and then is reflected from the curved optic and transmitted through the beamsplitter so that it forms image 552, which may be a 3D image as described above. The EVO of projector 540 may be incorporated into either the concave surface 558 of curved optic 548 or into beamsplitter 544, although the curved optic may be preferable in embodiments wherein the beamsplitter forms a relatively large angle with respect to the focal axis of the curved optic.

The embodiment of FIG. 16 similarly includes a planar beamsplitter 564 and a curved optic 568. In this case, however, curved optic 568 also is a beamsplitter, allowing the image source to be located along the focal axis of curved optic 568. In this embodiment, other optical elements (not shown), such as beamsplitters, quarter-wave retarders, polarizers, dual brightness enhancement film (DBEF), and/or other polarization components, may be used to suppress extraneous images. In this form, an EVO can easily be incorporated into beamsplitter 564, although it may be incorporated into curved optic 568, if desired. U.S. Pat. No. 6,262,841 to Dike describes an arrangement of optical elements that includes a DBEF to suppress unwanted images, and U.S. Pat. No. Re. 27,356 to La Russa describes an arrangement of optical elements that does not include a DBEF to suppress unwanted images. Those skilled in the art would readily be able to adapt the optical systems shown in the Dike and La Russa patents, as well as improvements thereon, to an optical system utilizing an EVO of the present invention to suppress unwanted images. Therefore, the Dike and La Russa patents are incorporated herein by reference in their entireties.

Figure 17:
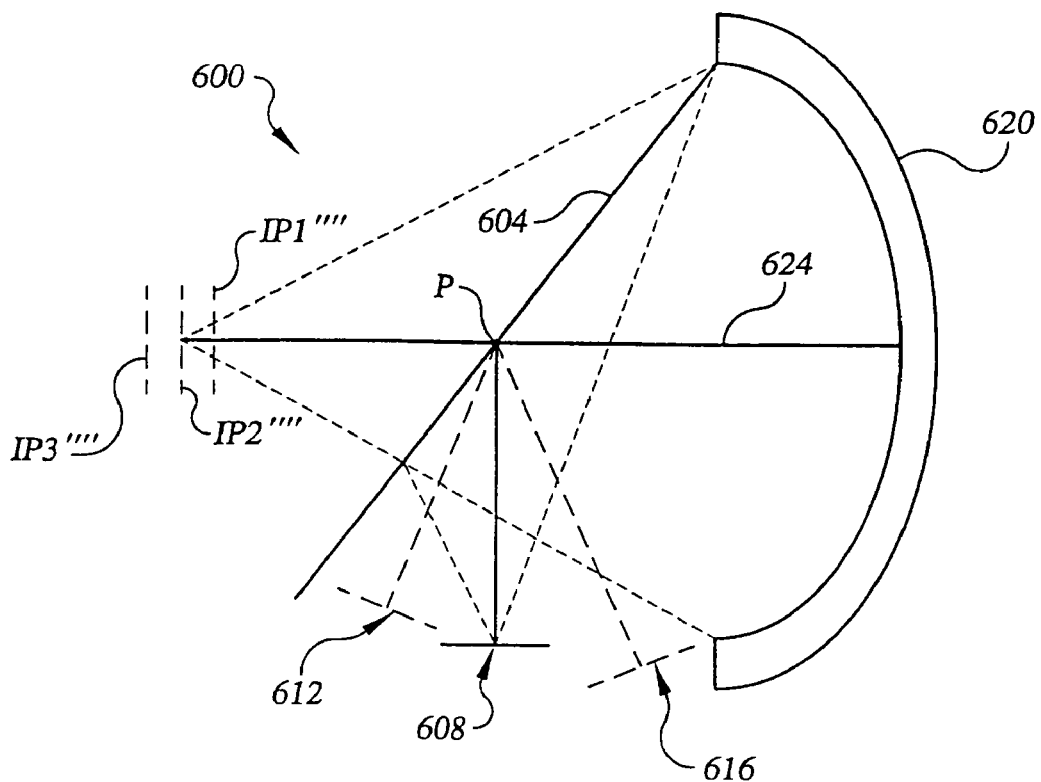
FIG. 17 is an alternative floating image projector of the present invention wherein an EVO functions as a scanning mirror to focus images from multiple image sources onto corresponding respective focal planes.

FIG. 17 shows a 3D floating image projector 600 in which a beamsplitter-type EVO 604 provides a scanning mirror rather than a variable optical power Fresnel-type optic. In this embodiment, the array of optical elements (not shown) of EVO 604, such as the array shown in FIG. 2, is not controlled in a manner that provides the EVO with variable focal lengths, but rather is controlled so that the image(s) from each of a plurality of image sources, e.g., image sources 608, 612, 616, are reflected in rapid succession to a curved optic 620, which may be a conventional curved mirror, or the like. Curved optic 620 then reflects these images through beamsplitting EVO 604 and onto corresponding image planes IP1'''', IP2'''', IP3''''. Image planes IP1'''', IP2'''', IP3'''' are spaced from one another by virtue of image sources 608, 612, 616 being located at different distances from a central point P on EVO 604. Thus, in this embodiment, EVO 604 acts as a variable mirror (and a beamsplitter) that approximates three conventional planar beamsplitters (not shown) that would otherwise be required to direct the image(s) from each image source 608, 612, 616 along the focal axis 624 of curved optic 620. To allow EVO 604 to reflect the images from the various image sources 608, 612, 616 (not shown) along focal axis 624, all of the optical elements of EVO 604 may be actuated simultaneously with one another, each by exactly the same amount and in the same direction as one another (for example), to provide a reflected beam in the required directions. Thus, EVO 604 acts as an extremely rapid scanning mirror, even though it may be relatively large in size. Of course, this type of EVO scanner has many applications apart from the 3D imaging application shown here. One simple example would be as a scanning or tracking mirror; e.g., in solar collectors (for slow tracking) or in rapid scanners of large size that would not be feasible with conventional mirrors.

EVO 604 of FIG. 17 may optionally be controlled to provide a multiple-direction reflector that reflects two separate images spaced from one another along a common axis, such as focal axis 624 of curved optic 620, simply by tilting selected optical elements (not shown) (e.g., alternate rows or columns, or a checkerboard pattern for a two-directional reflector) at different angles at the same time. While three image sources 608, 612, 616 are shown in FIG. 17 for purposes of illustration, it is to be appreciated that the present invention encompasses different numbers of sources. Also, while multiple image sources 608, 612, 616 may be used, alternatively a single image source may be used. With a similar variation in the effective reflection angles of beamsplitting EVO 604, a satisfactory 3D image may be created with a single image source. For example, a single image source may be controlled so that regions of the single image source are illuminated in synchronization with corresponding states of EVO 604, while the non-corresponding regions would be un-illuminated, e.g., in a "zero-black" mode.

Figure 18:
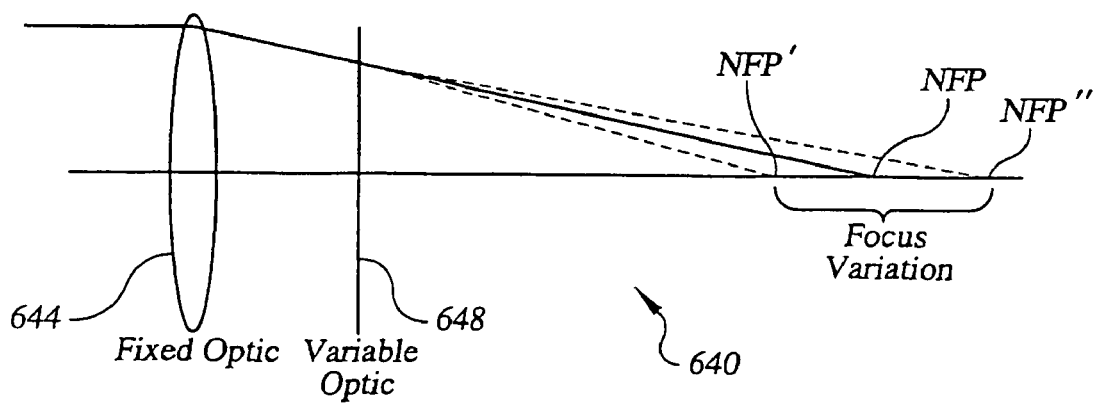
FIG. 18 is a schematic diagram illustrating a compound optical system (e.g., lens and/or mirror combination) of the present invention that incorporates a variable focus system similar to the variable focus system of FIG. 1.

As mentioned above, a variable focus EVO of the present invention has many more practical applications than only the 3D imaging systems discussed above. In fact, an EVO of the present invention may be used in practically any application wherein it is desired or necessary to converge and/or diverge electromagnetic energy at two or more focal lengths and/or along two or more focal axes in succession with one another. For example, FIG. 18 shows an example of a compound lens 640 containing a conventional fixed optic 644 in conjunction with an EVO 648 of the present invention. In FIG. 18, the nominal focal point NFP of fixed optic 644 (analogous to the conventional reflective optic of FIG. 6) is moved closer (NFP') or further (NFP'') by a very weak power change in EVO 648 (analogous to the reflective EVO). If the latter has converging power, the configuration is like a weak Petzval lens; if diverging, the combination is like a weak telephoto lens. FIG. 18 is to be understood as a refractive-analogue schematic showing the use of an EVO in conjunction with a conventional fixed optic. It depicts essentially the same concept shown earlier in FIG. 6, but in FIG. 18 the optical power variation is illustrated in a simpler and more easily grasped form, in which for convenience the EVO power is shown as refractive, although it may in reality be reflective, implying a reversal in subsequent light ray direction. Of course, for finite conjugates, "image plane" may be substituted for "focal plane".

As an example of the EVO's almost unlimited range of applications other than 3D imaging, another use of an EVO of the present invention is for a headlight of an automobile or other vehicle. In this application, an EVO of the present invention may be used to vary the divergence of the light beam emanating from the headlight and/or directing the beam in the direction the vehicle is being steered. The divergence of the light beam may be, e.g., varied as a function of vehicle speed. For example, at relatively low speeds the divergence of the beam may be relatively large so as to illuminate a wide path close to the vehicle, whereas at higher speeds, the divergence may be smaller so as to better illuminate distant objects. Likewise, flashlights and other types of illuminating devices may benefit from the incorporation of an EVO therein. Other uses of EVOs of the present invention may include their incorporation in electrically variable zoom lenses, autofocus systems, and variable-focus antennas for receiving and/or transmitting radio, microwave or other frequency signals, as well as their use as replacements for vision-testing instruments such as phoropters. Once those skilled in the art understand the basic operation of an EVO of the present invention as discussed above, they will appreciate the variety of applications in which an EVO can be used.

Although the invention has been described and illustrated with respect to several exemplary embodiments thereof, it should be understood by those skilled in the art that the foregoing and various other changes, omissions and additions may be made therein and thereto, without parting from the spirit and scope of the present invention defined by the appended claims.

What is claimed is:

1. A variable focus system, comprising:
  (a) an optic that includes a plurality of movable electrovariable optical elements; and
  (b) a controller coupled to said optic, said controller generating at least a first signal and a second signal, said first signal causing at least some of said plurality of movable electrovariable optical elements to move so as to provide said optic with a first focal length and said second signal causing at least some of said plurality of movable electrovariable optical elements to move so as to provide said optic with a second focal length different from said first focal length.

2. A variable focus system according to claim 1, wherein each one of said plurality of movable electrovariable elements is essentially only a reflector.

3. A variable focus system according to claim 1, wherein each one of said plurality of movable electrovariable elements is essentially only a refractor.

4. A variable focus system according to claim 1, wherein each one of said plurality of movable electrovariable elements is a beamsplitter.

5. A variable focus system according to claim 1, wherein each one of said plurality of movable electrovariable optical elements is a microelement.

6. A variable focus system according to claim 1, wherein at least one of said plurality of movable electrovariable elements comprises at least two optical components each having an optical property different from the other, each said optical property being selected from the group consisting of reflection, refraction, beamsplitting, opacity and transparency.

7. A variable focus system according to claim 1, wherein said optic is a MEMS optic.

8. A variable focus system according to claim 1, wherein each one of said plurality of movable electrovariable optical elements moves by tilting.

9. A variable focus system according to claim 1, wherein each one of said plurality of movable electrovariable optical elements moves by flexing.

10. An electrovariable optic comprising an optic in a variable focus system according to claim 1, wherein said first signal and said second signal are electrical signals.

11. A variable focus system according to claim 1, wherein each of said first and second focal lengths lie along a straight line that intersects said optic.

* * * * *